(12) United States Patent
Srinivasan et al.

(10) Patent No.: US 7,613,830 B2
(45) Date of Patent: *Nov. 3, 2009

(54) RELIABLY TRANSFERRING QUEUED APPLICATION MESSAGES

(75) Inventors: Krishnan Srinivasan, Kirkland, WA (US); Craig Andrew Critchley, Fall City, WA (US); Uday Shanker Hegde, Bellevue, WA (US); Alan S. Geller, Redmond, WA (US); David Owen Driver, Seattle, WA (US); Richard Douglas Hill, Kirkland, WA (US); Rodney Thomas Limprecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 787 days.

This patent is subject to a terminal disclaimer.

(21) Appl. No.: 11/009,178

(22) Filed: Dec. 10, 2004

(65) Prior Publication Data

US 2006/0168023 A1 Jul. 27, 2006

(51) Int. Cl.
*G06F 15/16* (2006.01)
(52) U.S. Cl. .................. 709/245; 370/389
(58) Field of Classification Search ........... 709/206, 709/245, 227; 370/389, 428, 351
See application file for complete search history.

(56) References Cited

U.S. PATENT DOCUMENTS

| 5,797,005 | A | * | 8/1998 | Bahls et al. ............... 719/314 |
| 5,887,168 | A | * | 3/1999 | Bahls et al. ............... 719/314 |
| 5,941,945 | A | * | 8/1999 | Aditham et al. ........... 709/205 |
| 5,999,964 | A | * | 12/1999 | Murakata et al. .......... 709/201 |
| 6,275,912 | B1 | * | 8/2001 | Haba ......................... 711/154 |
| 6,490,630 | B1 | * | 12/2002 | Poon et al. ................. 709/235 |
| 6,757,710 | B2 | * | 6/2004 | Reed ......................... 709/203 |
| 6,848,059 | B2 | * | 1/2005 | Bullman et al. ........... 713/323 |
| 7,095,855 | B1 | | 8/2006 | Collins |
| 7,200,153 | B2 | | 4/2007 | Feuerstraeter |
| 7,206,841 | B2 | * | 4/2007 | Traversat et al. .......... 709/225 |
| 7,240,089 | B2 | | 7/2007 | Boudreau |
| 7,249,195 | B2 | * | 7/2007 | Panec et al. ............... 709/238 |
| 7,293,038 | B2 | * | 11/2007 | Blevins et al. ............. 707/102 |

(Continued)

OTHER PUBLICATIONS

Horrell, Simon "Microsoft Message Queue," *Enterprise Middleware*, XEPHON, Newbury, US, Jun. 1999, pp. 25-35.

(Continued)

*Primary Examiner*—William C Vaughn, Jr.
*Assistant Examiner*—Thomas Richardson
(74) *Attorney, Agent, or Firm*—Workman Nydegger

(57) ABSTRACT

The present invention extends to methods, systems, and computer program products for reliably and securely transferring queued application messages. Application messages are (e.g.,. binary or text) encoded and then encapsulated in transfer messages, enqueue messages, and dequeue responses such that composable protocol elements used in application messages can be reused in the transfer messages, enqueue messages, and dequeue responses. Transfer message headers are encoded and then encapsulated along with encoded application messages such that composable protocol elements used in transfer headers and application messages can be reused in the store and forward messages. Application messages, transfer messages, enqueue messages, dequeue responses, and store and forward messages can all be configured in accordance with the same messaging protocol, such as, for example, Simple Object Access Protocol. Since encapsulated elements are encoded, the encapsulated elements do not interfere with configuration of wrapping messages.

47 Claims, 7 Drawing Sheets

U.S. PATENT DOCUMENTS

| | | | |
|---|---|---|---|
| 7,328,243 B2 * | 2/2008 | Yeager et al. | 709/205 |
| 2002/0110147 A1 * | 8/2002 | Eatough | 370/474 |
| 2003/0212818 A1 | 11/2003 | Klein et al. | 709/238 |
| 2004/0064511 A1 * | 4/2004 | Abdel-Aziz et al. | 709/206 |
| 2004/0064512 A1 * | 4/2004 | Arora et al. | 709/206 |
| 2004/0205216 A1 * | 10/2004 | Ballinger et al. | 709/231 |
| 2005/0114455 A1 * | 5/2005 | Conroy et al. | 709/206 |
| 2006/0059230 A1 * | 3/2006 | Dykas et al. | 709/206 |
| 2006/0130069 A1 | 6/2006 | Srinivasan | |
| 2006/0168052 A1 | 7/2006 | Srinivasan | |

OTHER PUBLICATIONS

"Server Isolation in Message Queueing System," *IBM Technical Disclosure Bulletin*, vol. 38, No. 12, Dec. 1, 1995, pp. 553-554.

Tegen, J. "SMQP: Simple Message Queue Protocol," *IETF Standard Working Draft, Internet Engineering Task Force*, IETF, CH, No. 6, Sep. 2001. Published on the internet at URL http://www.ietf.org/lid-abstracts.html.

Office Action dated May 12, 2008 cited in U.S. Appl. No. 11/159,854.

Office Action dated Nov. 28, 2008 cited in U.S. Appl. No. 11/159,854.

Office Action dated May 8, 2008 cited in U.S. Appl. No. 11/159,935.

* cited by examiner

RELIABLY TRANSFERRING QUEUED APPLICATION MESSAGES

CROSS-REFERENCE TO RELATED APPLICATIONS

Not applicable.

BACKGROUND OF THE INVENTION

1. The Field of the Invention

The present invention relates to electronic messaging and, more particularly, to reliably transferring queued application messages.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

In some environments, applications communicate with one another using queued communication. Queued communication includes mechanisms for a sending application to write a message into a queue and for a receiving application to read the message from the queue. The queue maintains communication state outside of the communicating parties, and provides a level of indirection between them. Queued communication is beneficial since it can increase fault tolerance.

For example, queued communication mechanisms can provide failure isolation allowing communicating applications to fail and restart independently, without losing communication state. That is, a sending application or receiving application can fail and a restart without losing communication state related to communication between the sending application and the receiving application. Further, queued communication mechanisms can provide connectivity isolation allowing communicating applications to come and go as needed. Thus, after writing a message to a queue, a sending application can go down without affecting the receiving application's ability to read the queued message.

To increase availability, some queue mechanisms implement a distributed queue model. For example, a sending application writes to a queue near the sending application and a receiving application reads from a (potentially different) queue near the receiving application. In distributed queue environments, the queues can transfer messages to and from other queues such that, for example, a message written to a sending queue (corresponding to a sending application) is delivered to a receiving queue (corresponding to a receiving application).

Unfortunately, most message queuing systems use proprietary protocols that limit interoperability. In some environments, such as, for example, relatively larger distributed networks, various queuing systems may be owned by different entities. Thus, in these environments there may be no way to ensure that all queuing systems implement a protocol that is compatible with other queuing systems. Accordingly, queuing systems can be limited to communicating only with other queuing systems that implement the same proprietary protocol.

Additionally, queuing environments (both single queue and distributed queue) have limited, if any, mechanisms for ensuring secured, reliable transfer of application messages from a sending application to a receiving application. For example, an application or queue failure can cause a message to be lost. Further, there is typically limited, if any, mechanism to store and forward messages at intermediaries and to recover from a failure at a store and forward intermediary. Additionally, it is difficult to guarantee that intermediaries ensure security constraints on messages and meet the reliable assurances specified for messages. Therefore systems, methods, and computer program products for reliably transferring queued application messages would be advantageous.

BRIEF SUMMARY OF THE INVENTION

The foregoing problems with the prior state of the art are overcome by the principles of the present invention, which are directed towards methods, systems, and computer program products for reliably transferring queued application messages. A queue channel receives an application message configured in accordance with a messaging protocol, such as, for example, Simple Object Access Protocol ("SOAP"). The queue channel configures an enqueue message in accordance with the messaging protocol (e.g., SOAP). The enqueue message identifies a message queue that is to queue the application message and possibly a message session corresponding to the application message. The queue channel encodes the application message into a corresponding encoded application message. The queue channel encapsulates the encoded application message in the enqueue message. The queue channel sends the enqueue message to a queue manager that controls the identified queue such that the application message can be queued for delivery to a receiving computer system.

A sending transfer layer dequeues the encoded application message. The sending transfer layer configures a transfer message in accordance with the messaging protocol (e.g., SOAP). The sending transfer message identifies the receiving computer system and, when appropriate, a corresponding message session. The sending transfer layer encapsulates the encoded application message in the transfer message. The sending transfer layer sends the transfer message for delivery to the receiving computer system.

A sending store and forward layer accesses the transfer message. The sending store and forward layer encodes a transfer header from the transfer message into a corresponding encoded transfer header. The sending store and forward layer configures a store and forward message in accordance with the messaging protocol (e.g., SOAP). The sending store and forward message is for delivery to a next store and forward service (an intermediary or a receiving computer system), based on the position of the sending store and forward layer system relative to a receiving computer system that is to receive the application message. The sending store and forward layer encapsulates the encoded transfer header and the encoded application message into the store and forward message. The sending store and forward service forwards the store and forward message to the next store and forward service.

In some embodiments, one or more intermediary store and forward services process store and forward messages that encapsulate an encoded transfer header and an encoded application message. An intermediate store and forward service accesses a store and forward message configured in accordance with a messaging protocol (e.g., SOAP). The intermediate store and forward service identifies a next store and forward service (another intermediate store and forward service or a receiving computer system) that is to receive the encapsulated encoded transfer header and encapsulated encoded application message, based on the location of the store and forward service relative to the receiving computer system. The intermediate store and forward service configures a new store and forward message in accordance with the messaging protocol. The intermediate store and forward service copies the body of the store and forward message into the body of the new store and forward message. The store and forward service forwards the new store and forward message to the next store and forward service.

A receiving store and forward layer receives a store and forward message configured in accordance with a messaging protocol (e.g., SOAP). The receiving store and forward layer decodes the encoded transfer header into a corresponding transfer header. The receiving store and forward layer configures a transfer message in accordance with the messaging protocol (e.g., SOAP). The receiving store and forward layer includes the transfer header in the transfer message to indicate how the transfer message is to be transferred to an application. The store and forward layer encapsulates the encoded application message in the transfer message and sends the transfer message to a receiving transfer layer.

The receiving transfer layer processes the transfer message. The transfer layer enqueues the encoded application message for delivery to an application. The transfer layer sends a message available message to indicate that the application message has been queued. A queue listener receives the message available message and sends a dequeue message to the receiving transfer layer. The receiving transfer layer receives the dequeued message and configures a dequeue response in accordance with the message protocol (e.g., SOAP). The receiving transfer layer encapsulates the encoded application message in the dequeued response.

The receiving transfer layer sends the dequeue response to the application. The queue listener receives the dequeue response. The queue listener decodes the encoded application message into the application message and sends the application message to the application. These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1A:
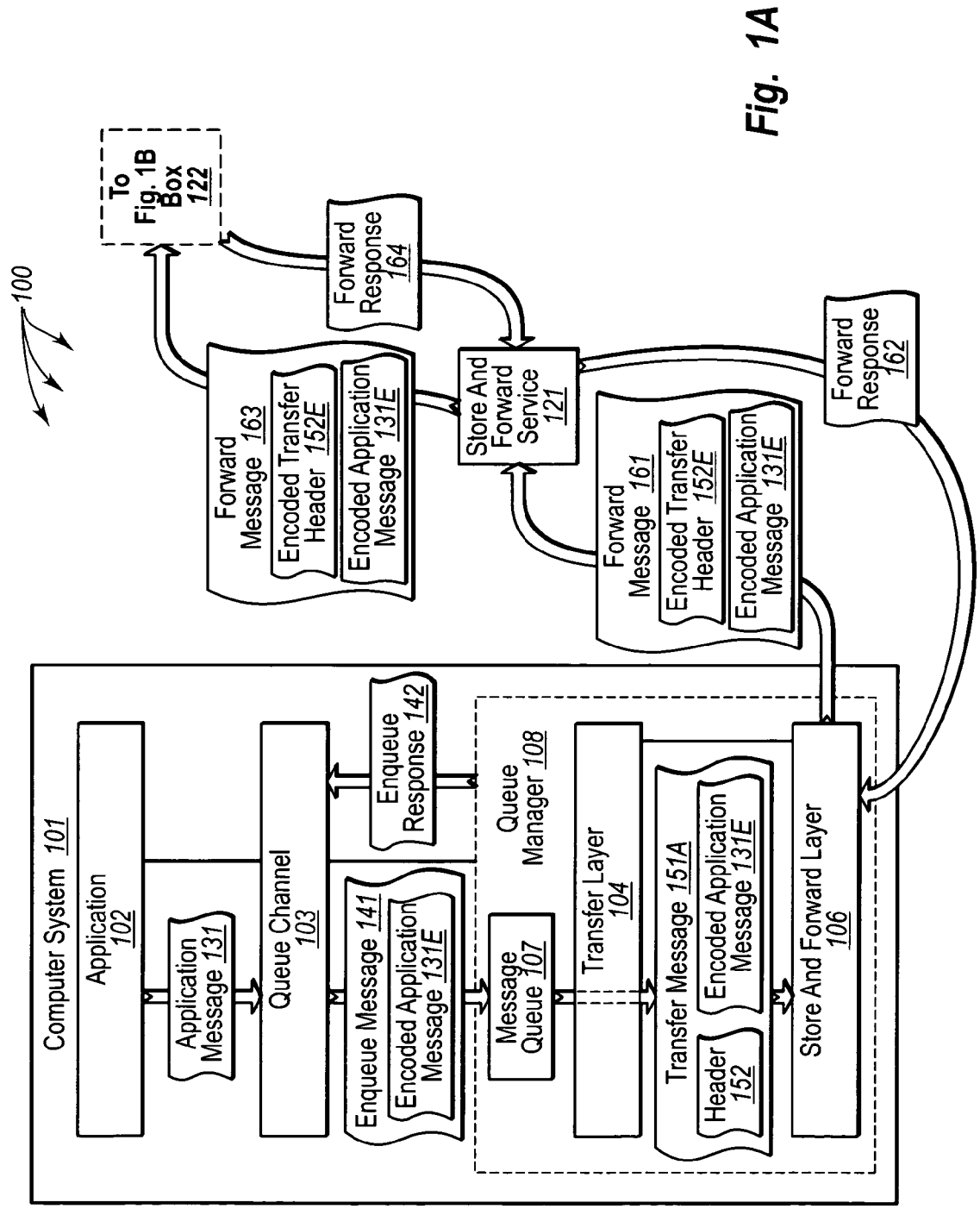
FIGS. 1A and 1B illustrate an example of a computer architecture that facilitates reliable transfer of queued application messages.

The principles of the present invention provide for reliably transferring queued application messages. A queue channel receives an application message configured in accordance with a messaging protocol, such as, for example, Simple Object Access Protocol ("SOAP"). The queue channel configures an enqueue message in accordance with the messaging protocol (e.g., SOAP). The enqueue message identifies a message queue that is to queue the application message and possibly a message session corresponding to the application message. The queue channel encodes the application message into a corresponding encoded application message. The queue channel encapsulates the encoded application message in the enqueue message. The queue channel sends the enqueue message to a queue manager that controls the identified queue such that the application message can be queued for delivery to a receiving computer system.

A sending transfer layer dequeues the encoded application message. The sending transfer layer configures a transfer message in accordance with the messaging protocol (e.g., SOAP). The sending transfer message identifies the receiving computer system and, when appropriate, a corresponding message session. The sending transfer layer encapsulates the encoded application message in the transfer message. The sending transfer layer sends the transfer message for delivery to the receiving computer system.

A sending store and forward layer accesses the transfer message. The sending store and forward layer encodes a transfer header from the transfer message into a corresponding encoded transfer header. The sending store and forward layer configures a store and forward message in accordance with the messaging protocol (e.g., SOAP). The sending store and forward message is for delivery to a next store and forward service (an intermediary or a receiving computer system), based on the position of the sending store and forward layer system relative to a receiving computer system that is to receive the application message. The sending store and forward layer encapsulates the encoded transfer header and the encoded application message into the store and forward message. The sending store and forward service forwards the store and forward message to the next store and forward service.

In some embodiments, one or more intermediary store and forward services process store and forward messages that encapsulate an encoded transfer header and encoded application message. An intermediate store and forward service accessing a store and forward message configured in accordance with a messaging protocol (e.g., SOAP). The intermediate store and forward service identifies a next store and forward service (another intermediate store and forward service or a receiving computer system) that is to receive the encapsulated encoded transfer header and an encapsulated encoded application message, based on the location of the store and forward service relative to the receiving computer system. The intermediate store and forward service configures a new store and forward message in accordance with the messaging protocol. The intermediate store and forward service copies the body of the store and forward message into the body of the new store and forward message. The store and forward service forwards the new store and forward message to the next store and forward service.

A receiving store and forward layer receives a store and forward message configured in accordance with a messaging protocol (e.g., SOAP). The receiving store and forward layer decodes the encoded transfer header into a corresponding transfer header. The receiving store and forward layer configures a transfer message in accordance with the messaging protocol (e.g., SOAP). The receiving store and forward layer includes the transfer header in the transfer message to indicate how the transfer message is to be transferred to an application. The store and forward layer encapsulates the encoded application message in the transfer message and sends the transfer message to a receiving transfer layer.

The receiving transfer layer processes the transfer message. The transfer layer enqueues the encoded application message for delivery to an application. The transfer layer sends a message available message to indicate that the application message has been queued. A queue listener receives the message available message and sends a dequeue message to the receiving transfer layer. The receiving transfer layer receives the dequeued message and configures a dequeue response in accordance with the message protocol (e.g., SOAP). The receiving transfer layer encapsulates the encoded application message in the dequeued response.

The receiving transfer layer sends the dequeue response to the application. The queue listener receives the dequeue response. The queue listener decodes the encoded application message into the application message and sends the application message to the application.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of aim a computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1B:
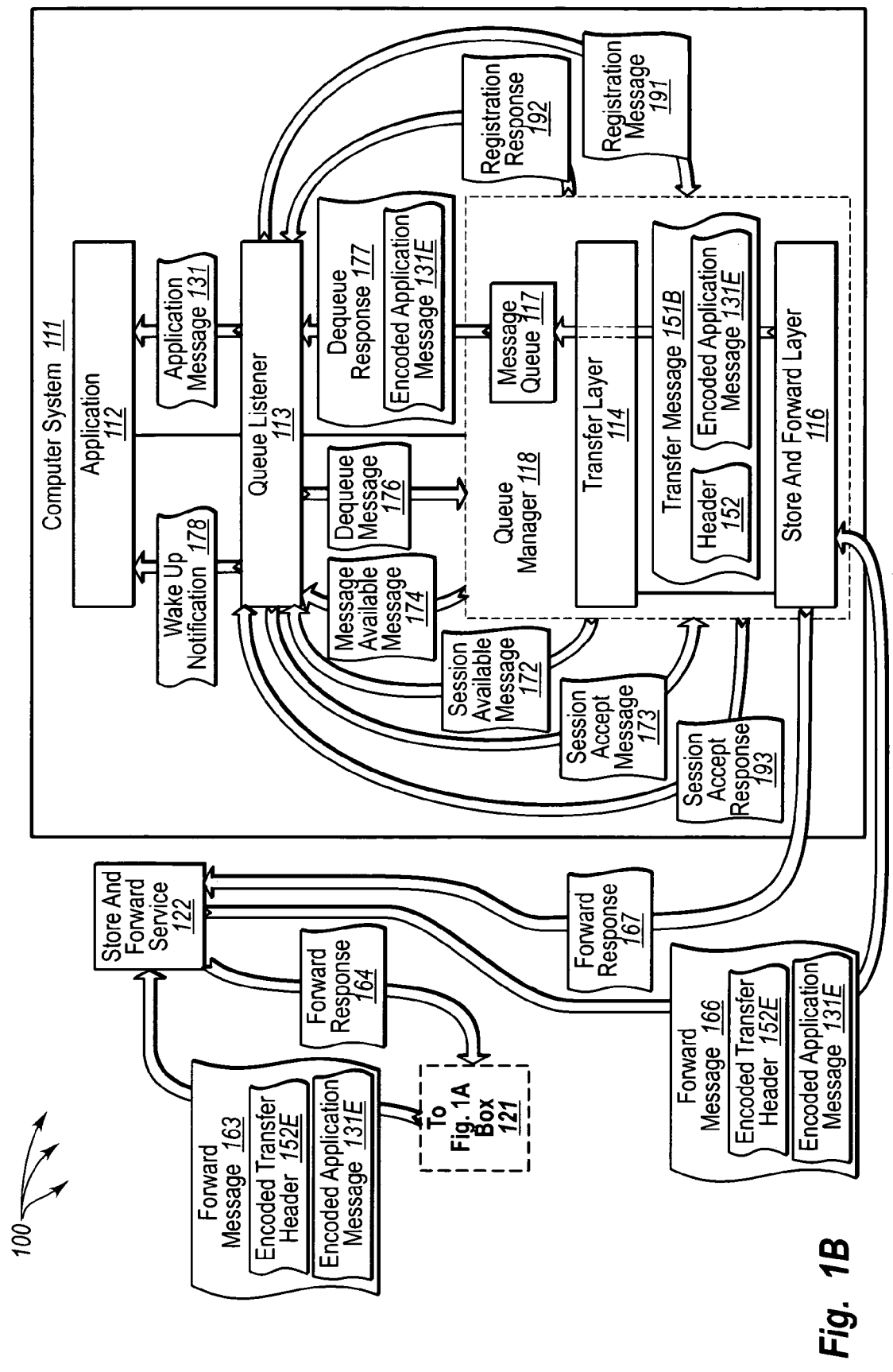

FIGS. 1A and 1B illustrate an example of a computer architecture 100 that facilitates reliable transfer of queued application messages. Depicted in computer architecture 100 are computer system 101, store and forward services 121 and 122, and computer system 111. Each of the computer systems and store and forward services can be connected to a network, such as, for example, a Local Area Network ("LAN"), Wide Area Network ("WAN"), or even the Internet. Computer systems and store and forward services connected to the network and can receive data from and send data to other computer systems and store and forward services connected to the network. Accordingly, computer systems 101 and 111 and store and forward services 121 and 122, as well as other connected computer systems and store and forward services (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, computer systems 101 and 111 and store and forward services 121 and 122 can create SOAP envelopes, exchange SOAP envelopes over the network, and receive SOAP envelopes.

In FIG. 1A, Computer system 101 includes application 102, queue channel 103, and queue manager 108. Application 102 can be a portion of a distributed application, such as, for example, a client proxy corresponding to application 112. Thus, from time to time, application 102 can have application messages to deliver to application 112. Queue channel 103 enqueues application messages for storage in queues controlled by queue manager 108. Queue channel 103 can include Application Program Interfaces ("APIs") that are called to enqueue a message. Accordingly, application 102 can call an API subroutine to enqueue an application message in message queue 107.

Queue manager 108 includes messages queue 107, transfer layer 104, and store and forward layer 106. Message queue 107 is configured to queue application messages sent from applications at computer system 101 (e.g., application 102) to other computer systems and to queue application messages from other computer systems that are sent to applications at computer system 101. Transfer layer 104 is configured to send transfer messages to and receive transfer messages from other queue managers (e.g., queue manager 118). Store and forward layer 106 is configured to send store and forward messages to and receive store and forward messages from other store and forward layers (e.g., store and forward layer 116) and store and forward services (e.g., store and forward services 121 and 122).

Within computer architecture 100, queue manager 108 and application 102 are both depicted as residing at computer system 101. However, it would be apparent to one skilled in the art, after having reviewed this description, that a queue manager and application that utilizes the queue manager can reside at different computer systems. For example, queue manager 108 can reside at some other computer system that is network connectable to computer system 101. In some embodiments, applications at a plurality of different computer systems read messages from a single queue to provide load-balancing.

Store and forward services 121 and 122 are intermediate store and forward services that send store and forward messages to other store and forward services and store and forward layers and receive store and forward messages from other store and forward services and store and forward layers.

In FIG. 1B, computer system 111 includes application 112, queue listener 113, and queue manager 118. Application 112 can be a portion of a distributed application, such as, for example, a service corresponding to application 112. Thus, from time to time, application 112 can have application messages that are received from application 102. Queue listener 113 dequeues application messages from queues controlled by queue manager 118. Accordingly, queue listener 113 can dequeue application messages from message queue 117. Queue listener 113 can also accept sessions from other queue managers, register interest in application messages corresponding to a specified session, and send wake up notifications to interested applications.

Queue manage 118 includes messages queue 117, transfer layer 114, and store and forward layer 116. Message queue 117 is configured to queue application messages sent from applications at computer system 111 (e.g., application 112) to other computer systems and to queue application messages from other computer systems that are sent to applications at computer system 101. Transfer layer 114 is configured to send transfer messages to and receive transfer messages from other queue managers (e.g., queue manager 108). Store and forward layer 116 is configured to send store and forward messages to and receive store and forward messages from other store and forward layers (e.g., store and forward layer 106) and store and forward services (e.g., store and forward services 121 and 122).

Within computer architecture 100, queue manager 118 and application 112 are both depicted as residing at computer system 111. However, it would be apparent to one skilled in the art, after having reviewed this description, that a queue manager and application that utilizes the queue manager can reside at different computer systems. For example, queue manager 118 can reside at some other computer system that is network connectable to computer system 111. As previously described, applications at a plurality of different servers read messages from a single queue to provide load-balancing.

Generally, the modules in computer architecture 100 can interoperate to facilitate reliable transfer of queued application messages. Embodiments of the present invention can utilize a variety of different protocols to implement reliable transfer of queued application messages.

An application session management protocol can be implemented to establish and tear down queued sessions between applications (e.g., between application 102 and application 112). All messages within a session share associated assurances such as exactly once and in order delivery to the target application. Applications can use a queued channel API implemented in a client library to send and receive messages on a queued session. Queued session state can be persisted in a corresponding queue, whereas queued channels used for capture and delivery are maintained in the application address space and are transient. Session attachment and detachment mechanisms can be used to decouple the lifetime of the queued channels and the session in the queue (e.g., as part of the capture/delivery protocol).

An acknowledgement process can send store/forward acks, transfer acks, and delivery acks, and the sender takes various actions on these. For example, a queue manager can stop attempting to forward messages after receiving a store/forward acknowledgement. Also, errors may be returned during transfer or delivery, which cause messages to move to a dead queue immediately without waiting for expiration.

Generally, queued sessions are used to correlate a set of messages. The application writer defines a set of messages as part of a queued session. Queued sessions can be long running and are uniquely identified by an identifier in the queue. Thus, queued sessions can outlive the lifetime of the applications that read from or write to the queued sessions. Queued sessions are also recoverable. That is, applications can fail, recover and re-attach to the queued session to continue its operation on the session.

Applications using queued communication set reliability requirements for the transfer of messages via a message expiration and message request for delivery acknowledgements. Messages can expire based on expiration time set by the user. When messages expire, the sending side queue moves the message to a dead queue. Delivery acknowledgements are generated by a corresponding receiving side queue manager when the receiving side application successfully consumes a message. The delivery acknowledgement is an indication to the sending side queue manager (e.g., queue manager 108) that the message was delivered successfully to the application (e.g., application 112).

A queue capture protocol can be implemented between a queue channel (e.g., queue channel 103) and queue manager (e.g., queue manager 108) to provide a very high likelihood of synchronous reliable transfer of an application message (e.g., application message 131) from a sending side application (.e.g., application 102) to a sending side message queue (e.g., message queue 107). A queue capture protocol can utilize message encapsulation to tunnel an application message in an enqueue message request (e.g., enqueue message 141) to a queue manager. When an encapsulated application message is successfully written to a message queue, the queue manager returns an enqueue response (e.g., enqueue response 142) to the queue channel. An enqueue message request and corresponding enqueue response can be part of a two-phase commit protocol. An enqueue message request can include an atomic transaction context that facilitates coordination of an enqueue operation with other application state changes.

A transfer protocol can be implemented between a sending queue manager (e.g., queue manager 108) and a receiving queue manager (e.g., queue manager 118). A transfer protocol can utilize message encapsulation to tunnel an application message in a transfer message (e.g., transfer message 151) sent from one queue manager to another queue manager. A sending side queue manager facilitates initiation of a secure and reliable transfer session with a corresponding receiving side queue manager, the correlation and sequencing of messages with a session, and the processing of transfer acknowledgements from the receiving side queue manager. The receive side queue manager facilitates acceptance of transfer sessions, receiving messages on the session, and sending transfer acknowledgments.

A transfer protocol can also include mechanisms for detecting holes in a message sequence. Generally, exchanged messages are numbered and expired messages will cause holes in the message sequence. Accordingly, a sending side queue can send transfer cancel message to a receiving side queue to close holes in its acknowledgement range.

A store and forward protocol can be implemented to transfer messages between store and forward layers (e.g., between store and forward layers 106 and 116), between a store and forward intermediate and a store and forward layer (e.g., between store and forward layers 106 and store and forward service 121), and between store and forward services (e.g., between store and forward service 121 and store and forward service 122). A transfer protocol can provide an extensibility model such that intermediate store and forward services are transparently interposed between a sending side queue and a receiving side queue. Messages can be forwarded through intermediate store and forward services without significantly affecting the end to end reliability of a transfer message. A store and forward protocol can utilize message encapsulation that encloses transfer headers and application messages in a store and forward message (e.g., forward message 161) and forwards the forward message to the next hop. In response to receiving a store and forward message, an appropriately configured module can return a store and forward response (e.g., forward response 162).

A delivery protocol can be implemented to deliver an application message from a receiving side queue (e.g., message queue 117) to a corresponding application (e.g., application 112). A delivery protocol can send a session available message (e.g., session available message 172) or message available message (e.g., message available message 174) to a queue listener (e.g., queue listened 113). The queue listener responds with a dequeue message request (e.g., dequeue message 176) to read an application message (or other appropriate message) from the queue. Dequeueing can be performed in accordance with a Web Services specification, such as, for example, WS-Enumeration. In response to a dequeue message request, a queue manager (e.g., queue manager 118) can send a dequeue response that includes an application message (or other appropriate message). A dequeue message request and corresponding dequeue response can be part of a two-phase commit protocol. An dequeue message request can include an atomic transaction context that facilitates coordination of a dequeue operation with other application state changes.

A wakeup notification protocol can be implemented to wakeup a receiving side application (e.g., application 112) when an application message is available. For example, applications that read messages from a queue can be hosted in a container. From time to time, an application may not be running for a variety of reasons. For example, an application may have failed, an application may have idled out, or recycled etc. The wakeup notification protocol mechanism provides for notifying a hosting environment of the availability of messages in a queue. The hosting environment may use this to start the application or start another instance of the application or schedule it for running.

In some embodiments, a queue manager hosts one or more queues. Accordingly, the queue manager can implement a capture, delivery, transfer and store/forward protocol for all queues it hosts. The queue manager can be configured to multiplex queue to queue transfers between the same two queue managers over a single transfer session.

As described above, protocols for implementing reliable transfer of queued application messages can utilize message encapsulation. Generally, message encapsulation includes wrapping (at least a portion of) a first message (e.g., an application message) in a second message (e.g., a transfer message). In some embodiments, the first and second messages are configured in accordance with the same messaging protocol, such as, for example, Simple Object Access Protocol ("SOAP"). Thus, it may be that one or more of the previously described protocols encapsulates (at least a portion of) a first SOAP envelope, such as, for example, an eXtensible Markup Language ("XML") element, in a second SOAP envelope. Accordingly, encapsulation can be used to capture a SOAP application message in a SOAP enqueue message, to transfer a SOAP application message in a SOAP transfer message, and deliver a SOAP application message in SOAP dequeue response. A similar encapsulation mechanism can be used to encapsulate a transfer header and an application message in a store and forward message.

When encapsulating an inner XML element (e.g., an application SOAP envelope) inside another XML element (e.g., a transfer SOAP envelope), the inner or wrapped XML element can be encoded (or serialized) according to a wrapping algorithm. Various encoding techniques, such as, for example, binary and text encoding can be used. In some embodiments, wrapping algorithms utilize base64 binary encoding to encode wrapped XML elements. An XML element, such as, for example, nq:WrappedXmlBase64, can be used to indicate the encoding type of an encoded XML element. An encoded XML element can also have a corresponding attribute, such as, for example, nq:ContentType, that defines the original content type. Thus, wrapping facilitates the encapsulation of a (binary or text) encoded SOAP envelope inside another SOAP envelope.

An unwrapping algorithm can decode (or deserialize) an encoded XML element. For example, an unwrapping algorithm can provide the encoding type and original content type to a corresponding XML reader. Thus, a base64 encoded XML element's value can be provided to a binary XML reader to decode the value into the corresponding unencoded XML element.

Message encapsulation facilitates the reuse of Web Services protocol elements between different messaging layers. For example, encapsulation facilitates the reuse of addressing, security, reliability, and transaction protocol elements between an application layer, a transfer layer and a store and forward layer. For example, when a transfer SOAP envelope encapsulates an encoded application SOAP envelope, composable protocol elements of the application SOAP envelope do not interfere with composable protocol elements of the transfer envelope (since the composable elements are encoded). Yet, composable protocol elements of the application SOAP envelope can be efficiently accessed through decoding.

Figure 2:
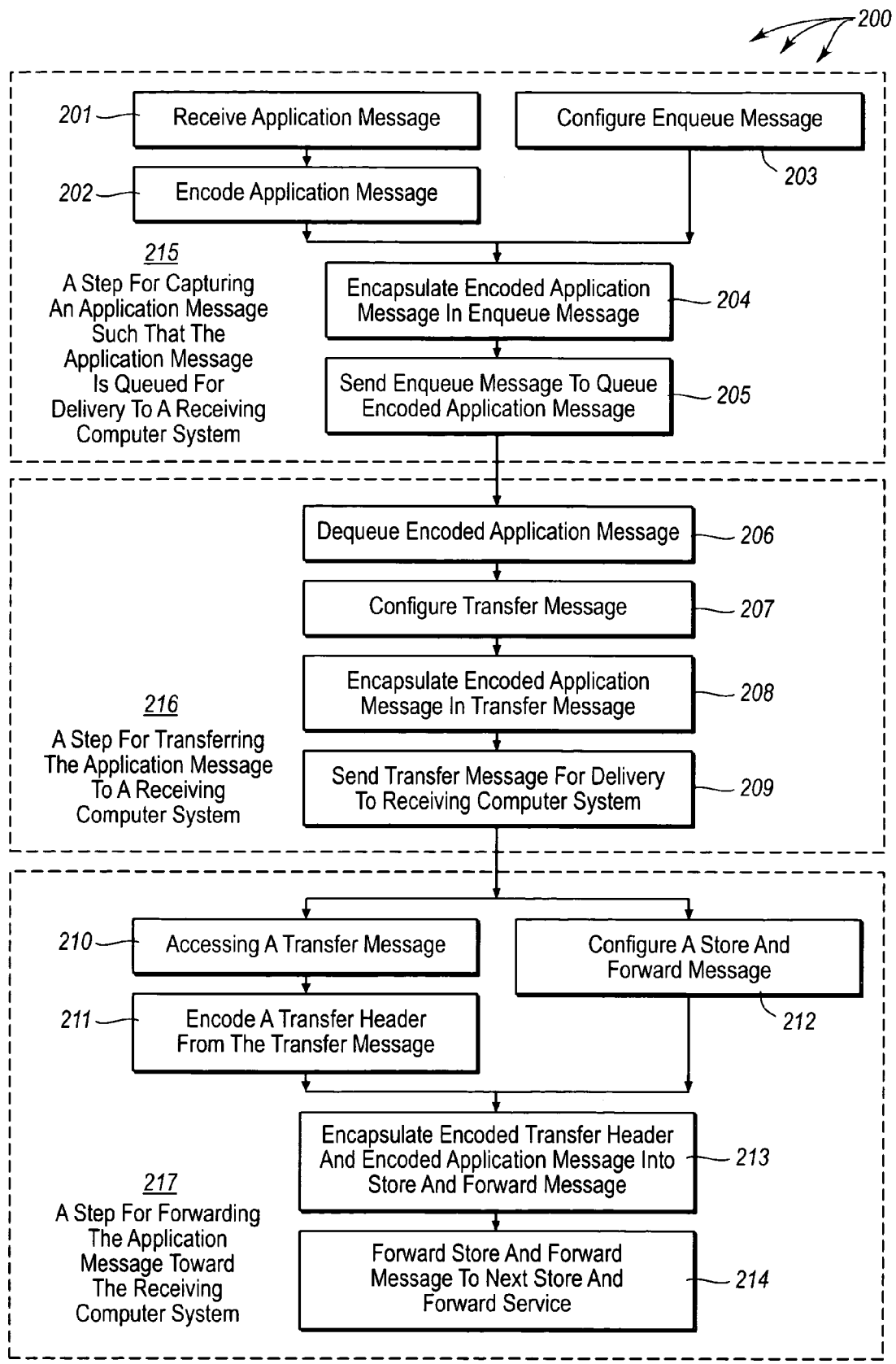
FIG. 2 illustrates an example flow chart of a method of reliably sending a queued application message.

FIG. 2 illustrates an example flow chart of a method 200 of reliably sending a queued application message. Method 200 will be described with respect to the modules and data in computer architecture 100.

Method 200 includes a functional result-oriented step for capturing an application message such that the application message is queued for delivery to a receiving computer system (step 215). Step 215 can include any corresponding acts for accomplishing the result of capturing an application message such that the application message is queued for delivery to a receiving computer system. However, in the illustrated example of FIG. 2, the step 215 includes a corresponding act of receiving an application message (act 201). For example, queue channel 103 can receive application message 131 from application 102. Application message 131 can be included in a subroutine call (to queue channel 103) for enqueueing application message 131 in a message queue. Application message 131 can be configured in accordance with a messaging protocol, such as, for example, SOAP. Accordingly, application message 131 can include an application SOAP envelope containing application data that is to be sent to application 112. Generally, an application SOAP envelope can be of the following format:

```
<s:Envelope>
  <s:Header>
    Application Headers
  </s:Header>
  <s:Body>
    Application Data
  </s:Body>
</s: Envelope>
```

Step 215 includes a corresponding act of encoding the application message (act 202). For example, queue channel 103 can encode application message 131 (including composable protocol elements) into corresponding (e.g., binary or text) encoded application message 131E. Queue channel 103 can execute a wrapping algorithm that takes an application message, an encoding type, and a content type as input and returns an encoded application message as output. For example, the wrapping algorithm can receive application message 131, a base64 encoding type, and a string content type as input and can return encoded application message 131E as output.

Queue channel 103 can optionally encrypt and/or digitally sign encoded application message 131E as well. Encrypting and/or digitally signing encoded application message 131 E helps ensure that the application message 131E is not modified or intercepted during transmission. Encoded application message 131E can be secured using any of a variety of different security mechanisms, such as, for example, WS-Security.

Step 215 includes a corresponding act of configuring an enqueue message (act 203). For example, queue channel 103 can configure enqueue message 141. Enqueue message 141 can be configured in accordance with the same messaging protocol as application message 131. Accordingly, enqueue message 141 can also include a SOAP envelope. Enqueue message 141 can identify a message queue that is to queue encoded application message 131E and can identify a message session corresponding to application message 131. For example, enqueue message 141 can identify message queue 117 and can identify a message session between application 102 and application 112. Queue manager 108 can use message queue 107 as a transfer queue.

Since composable protocol elements (e.g., addressing, security, reliability, and transaction protocol elements) of application message 131 are encoded, the composable protocol elements of application message 131 do not interfere with the configuration of enqueue message 141. Accordingly, any composable protocol elements included in application message 131 can be reused in enqueue message 141.

Step 215 includes a corresponding act of encapsulating the encoded application message in the enqueue message (act 204). For example, queue channel 103 can encapsulate encoded application message 131E in enqueue message 141. Generally, an enqueue message can be of the format (before being secured):

```
<s:Envelope . . . >
  <s:Header>
    <wsa:Action s:mustUnderstand="true">
      http://schemas.testcorp.com/queuing/EnqueueMessage
    </wsa:Action>
    <wsa:To>xs:anyURI</wsa:To>
    <wscoor:CoordinationContext s:mustUnderstand="true"> . . .
  </wscoor:CoordinationContext> ?
    <nq:QueueName>xs:anyURI</nq:QueueName>
    <wsa:ReplyTo>wsa:EndpointReferenceType</wsa:ReplyTo>
    <wsa:MessageID>xs:anyURI</wsa:MessageID>
    <nq:Sequence Ordered="1"? >
      <wsu:Identifier>xs:anyURI</wsu:Identifier>
        <wsrm:MessageNumber>xs:unsignedlong</
          wsrm:MessageNumber> ?
      <wsrm:LastMessage /> ?
    </nq:Sequence> ?
    <wsu:Expires>xsd:dateTime</wsu:Expires>
    <nq:Volatile /> ?
    <nq:ErrorQueueName>xs:anyURI</nq:ErrorQueueName> ?
    . . .
  </s:Header>
  <s:Body>
    <nq:EnqueueMessage>
      <nq:ApplicationMessage>
        <nq:WrappedXmlBase64 nq:ContentType="xs:string">
          binary base64 wrapped message
        </nq:WrappedXmlBase64>
      </nq:ApplicationMessage>
    </nq:EnqueueMessage>
  </s:Body>
</s:Envelope
```

Within an enqueue message, the /s:Envelope/s:Header/nq: Sequence element can be used to associate the enqueue message with an application session. The /s:Envelope/s:Header/ nq:Sequence/@Ordered element can be used to indicate if the application session is ordered (e.g., "1" or "true" indicates an ordered application session). The /s:Envelope/s:Header/nq: Sequence/wsu:Identifier element can be used to contain the session identifier. The /s:Envelope/s:Header/nq:Sequence/ wsrm:MessageNumber element can be used to contain the sequence number of the (encoded) application message in the application session. Sequence numbers start at an initiate value, such as, for example, 1, and increment, such as, for example, by 1. The /s:Envelope/s:Header/nq:Sequence/ wsrm:LastMessage element can be used to indicate the (encoded) application message is the last message for the application session.

The /s:Envelope/s:Header/wscoor:CoordinationContext element can be used to indicate if the enqueue message is to be executed as part of an atomic transaction. If so, the /s:Envelope/s:Header/wscoor:CoordinationContext element can contain the atomic transaction context. The /s:Envelope/s:Header/nq:QueueName element can be used to indicate a reference parameter containing the name (URI) of the logical queue the listener (e.g., queue listener 113) wants to listen to. The /s:Envelope/s:Header/wsu:Expires element can be used to indicate the expiration timestamp for the (encoded) application message. The /s:Envelope/s:Header/nq:Volatile element can be used to indicate that the (encoded) application message need not be written to a persistent store in order to have its delivery be acknowledged. The /s:Envelope/s:Header/wsu:ErrorQueueName element can be used to indicate the queue name URI of the logical queue the (encoded) application message should be written to in case of a delivery error. The /s:Envelope/s:Body/*/nq:WrappedXmlBase64 element contains the complete SOAP envelope of the (encoded) application message, appropriately wrapped. The /s:Envelope/s:Body/*/nq:WrappedXmlBase64/@nq:ContentType element indicates the content type of the (encoded) application message.

Subsequent to encapsulating encoded application message 131E, enqueue message 141 can be encrypted and/or digitally signed. Digitally signing enqueue message 141 provides queue manager 108 some assurance of the authenticity of enqueue message 141 and can prevent injecting additional messages into message queue 107. Enqueue message 141 can be secured using any of a variety of different security mechanisms including WS-Security or transport layer security, such as, for example, Secure Sockets Layer ("SSL").

Step 215 includes a corresponding act of sending the enqueue message to queue the encoded application message (act 205). For example, queue channel 103 can send enqueue message 141 to queue manager 108. When appropriate, queue channel 103 can encrypt enqueue message 141 before sending enqueue message 141 to queue manager 108. Queue manager 108 controls message queue 107 and can queue encoded application message 131 E for delivery to application 112.

Queue manager 108 can receive enqueue message 141 and store encoded application message 131E in message queue 107.

Subsequent to storing encoded application message 131E in message queue 107, queue manager 108 can send enqueue response 142 (potentially encrypted and/or digitally signed) to queue channel 103 to acknowledge receipt of enqueue message 141. Queue channel 103 can receive enqueue response 142. Enqueue response 142 indicates to queue channel 103 that queue manager 108 successfully queued encoded application message 131E. Generally, an enqueue response can be of the format (before being secured):

```
<s:Envelope . . . >
  <s:Header>
    <wsa:Action>
      http://schemas.testcorp.com/queuing/EnqueueMessageResponse
    </wsa:Action>
    <wsa:To>xs:anyURI</wsa:To>
    <wsa:RelatesTo>request message ID</wsa:RelatesTo>
    <wsa:MessageID>xs:anyURI</wsa:MessageID>
    . . .
```

-continued

```
  </s:Header>
  <s:Body />
</s:Envelope>
```

Generally, elements in an enqueue response have the same meaning as previously described with respect to an enqueue message. Further, the element /s:Envelope/s:Header/wsa:RelatesTo can be used to relate an enqueue response to a corresponding enqueue message. For example, enqueue response 142 can include a relates to value that identifies enqueue message 141. In some embodiments, an enqueue message and corresponding enqueue response are part of a two-phase commit protocol.

Method 200 includes a functional result-oriented step for transferring the application message to a receiving computer system (step 216). Step 216 can include any corresponding acts for accomplishing the result of transferring the application message to a receiving computer system. However, in the illustrated example of FIG. 2, the step 216 includes a corresponding act of dequeueing an encoded application message (act 206). For example, transfer layer 104 can dequeue encoded application message 131E from message queue 107.

Step 216 includes a corresponding act of configuring a transfer message (act 207). For example, transfer layer 104 can configure transfer message 151A. Transfer message 151A can be configured in accordance with the same messaging protocol as application message 131. Accordingly, transfer message 151A can also include a SOAP envelope. Transfer message 151A can identify a message session corresponding to the encoded application message 131E and can identify a receiving computer system that is participating in the message session. For example, transfer message 151A can identify a message session between application 102 and application 112.

Transfer layer 104 can decrypt any encrypted portions of the enqueue message 141 (e.g., encrypted as per WS-Security) and reconstitute the clear text of enqueue message 141. Transfer layer 104 copies appropriate headers, such as, for example, nq:QueueName; nq:Volatile; wsu:Expires; nq:Sequence, from enqueue message 141 to transfer message 151A. If an application session identifier element, such as, for example, nq:Sequence, is present, transfer layer 104 calculates the next sequential message number for this session, adds it to the nq:Sequence element as the value of the MessageNumber element, and updates any local state.

Since composable protocol elements (e.g., addressing, security, reliability, and transaction protocol elements) of application message 131 are encoded, the composable protocol elements of application message 131 do not interfere with the configuration of transfer message 151A. Accordingly, any composable protocol elements included in application message 131 can be reused in transfer message 151A.

Transfer layer 104 can optionally encrypt and/or digitally sign transfer message 151A. Securing transfer message 151A provides queue manager 108 some assurance of the authenticity of transfer message 151A and can prevent injecting additional messages into message queue 107. Transfer message 151A can be secured using any of a variety of different security, such as, for example, WS-Security.

Step 216 includes a corresponding act of encapsulating the encoded application message in the transfer message (act 208). For example, transfer layer 104 can encapsulate encoded application message 131E in transfer message 151A. Thus, in some embodiments, transfer layer 104 copies the nq:ApplicationMessage body element of enqueue message 141 to the body of the transfer message 151A. Generally, a transfer message can be of the format (before being secured):

```
<s:Envelope>
  <s:Header>
    <wsa:Action>
      http://schemas.testcorp.com/queuing/TransferMessage
    </wsa:Action>
    <wsa:To>xs:anyURI</wsa:To>
    <nq:QueueName>xs:anyURI</nq:QueueName>
    <wsa:ReplyTo>wsa:EndpointReferenceType</wsa:ReplyTo>
    <wsa:MessageID>xs:anyURI</wsa:MessageID>
    <nq:Sequence Ordered="1"? >
      <wsu:Identifier>xs:anyURI</wsu:Identifier>
      <wsrm:MessageNumber>xs:unsignedLong</wsrm:MessageNumber>
      <wsrm:LastMessage /> ?
    </nq:Sequence> ?
    <wsu:Expires>xsd:dateTime</wsu:Expires>
    <nq:Volatile /> ?
    <nq:ErrorService>wsa:EndpointReferenceType</nq:ErrorService>
  </s:Header>
  <s:Body>
    <nq:TransferMessage>
      <nq:ApplicationMessage>
        <nq:WrappedXmlBase64 nq:ContentType="xs:string">
          binary base64 wrapped message
        </nq:WrappedXmlBase64>
      </nq:ApplicationMessage>
    </nq:TransferMessage>
  </s:Body>
</s:Envelope>
```

Generally, elements in a transfer message have the same meaning as previously described with respect to an enqueue message and enqueue response. Additionally, the /s:Envelope/s:Header/wsu:ErrorService element can be used to indicate a location the (encoded) application message should be sent to in case of a delivery error.

Step 216 includes a corresponding act of sending the transfer message for delivery to the receiving computer system (act 209). For example, transfer layer 104 can send transfer message 151 A for delivery to application 112.

Method 200 includes a functional result-oriented step for forwarding the application message toward the receiving computer system (step 217). Step 217 can include any corresponding acts for accomplishing the result of forwarding the application message toward the receiving computer system. However, in the illustrated example of FIG. 2, the step 217 includes a corresponding act of accessing a transfer message (act 210). For example, store and forward layer 106 can access transfer message 151 A.

Step 217 includes a corresponding act of encoding a transfer header from the transfer message (act 211). For example, store and forward layer 106 can encode transfer header 152 into encoded transfer header 152E. Store and forward layer 106 can execute a wrapping algorithm that takes an encoding type (e.g., base64), a content type (e.g., string), and a transfer header as input and returns an encoded transfer header as output. In some embodiments, other portions of transfer message 151A are also encoded.

Step 217 includes a corresponding act of configuring a store and forward message (act 212). For example, store and forward layer 106 can configure forward message 161. Forward message 161 can be configured in accordance with the same messaging protocol as application message 131. Accordingly, forward message 161 can also include a SOAP envelope. Forward message 161 can be for delivery to a next store and forward service (or store and forward layer) based on the position of application 102 (or computer system 101) relative to application 112 (or computer system 111) within computer architecture 100. Store and forward layer 106 copies appropriate headers from transfer message 151A, such as, for example, an nq:Volatile header, into forward message 161.

Since composable protocol elements (e.g., addressing, security, reliability, and transaction protocol elements) of application message 131 and transfer message 151A are encoded, the composable protocol elements of application message 131 and transfer message 151A do not interfere with the configuration of store and forward message 161. Accordingly, any composable protocol elements included in application message 131 and (e.g., the headers of) transfer message 151A can be reused in forward message 161.

Step 217 includes a corresponding act of encapsulating the encoded transfer header and encoded application message into the store and forward message (act 213). For example, store and forward layer 106 can encapsulate encoded transfer header 152E and encoded application message 131E into forward message 161. When appropriate, other portions of transfer message 151A can also be encapsulated.

Store and forward layer 106 can encode the s:Header element of transfer message 151A and encapsulate the encoded s:Header as a child element named nq:WrappedXmlBase64 of an nq:TransferHeader body element. Store and forward layer 106 can also copy an nq:ApplicationMessage body element of the transfer message 151A to forward message 161. Generally, a store and forward message can be of the format (before being secured):

```
<s:Envelope>
  <s:Header>
    <wsa:Action>
      http://schemas.testcorp.com/queuing/ForwardMessage
    </wsa:Action>
    <wsa:To>xs:anyURI</wsa:To>
    <nq:Volatile /> ?
  </s:Header>
  <s:Body>
    <nq:ForwardMessage>
      <nq:TransferHeader>
        <nq:WrappedXmlBase64 nq:ContentType="xs:string">
          binary base64 wrapped transfer header
        </nq:WrappedXmlBase64>
      </nq:TransferHeader>
      <nq:ApplicationMessage>
        <nq:WrappedXmlBase64 nq:ContentType="xs:string">
          binary base64 wrapped message
        </nq:WrappedXmlBase64>
      </nq:ApplicationMessage> ?
    </nq:ForwardMessage>
  </s:Body>
</s:Envelope>
```

Generally, elements in a store and forward message have the same meaning as previously described with respect to an enqueue message, an enqueue response, and a transfer message. Additionally, the /s:Envelope/s:Header/nq:Volatile element can be used to indicate that the store and forward message not be written to a persistent store in order to have its delivery be acknowledged. The /s:Envelope/s:Body/*/nq:TransferHeader/nq:WrappedXmlBase64 element can be used to indicate the encapsulated s:Header element of a transfer message assembled by the sending queue service. The /s:Envelope/s:Body/*/nq:ApplicationMessage/nq:WrappedXmlBase64 element can be used to indicate an encapsulated application message, appropriately wrapped.

Store and forward layer 106 can store encoded transfer header 152E (and potentially other encoded portions of transfer message 151A) and encoded application message 131E in a temporary storage location.

Step 217 includes a corresponding act of forwarding the store and forward message to the next store and forward service (act 214). For example, store and forward layer 106 can forward forward message 161 to store and forward service 121. Alternately, store and forward service 121 can identify a receiving store and forward layer (e.g., store and forward layer 116). When appropriate, store and forward layer 106 can encrypt and/or digitally sign forward message 161 before sending forward message 161 to a store and forward service or other store and forward layer. Securing forward message 161 helps prevent unauthorized readers from accessing forward message 161. Forward messages 161 can be secured using any of a variety of different security mechanisms including WS-Security or transport layer security, such as, for example, Secure Sockets Layer ("SSL").

Figure 3:
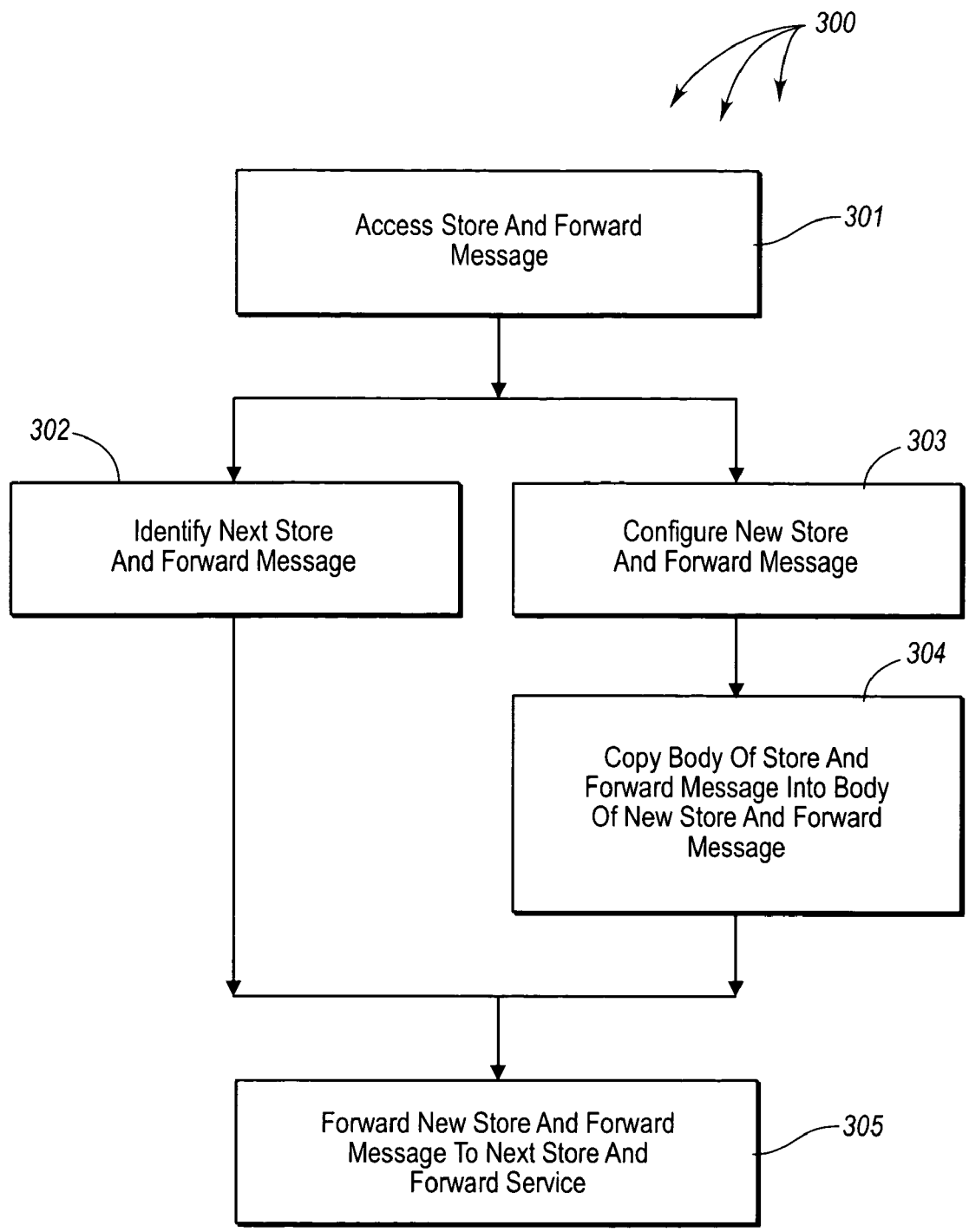
FIG. 3 illustrates an example flow chart of a method of reliably forwarding a queued application message.

FIG. 3 illustrates an example flow chart of a method 300 of reliably forwarding a queued application message. Method 300 will be described with respect to the modules and data in computer architecture 100.

Method 300 includes an act of accessing a store and forward message (act 301). For example, store and forward service 121 can receive forward message 161. As previously described, forward message 161 can be a SOAP envelope that encapsulates encoded transfer header 152E (and potentially other portions of transfer message 151A) and encoded application message131E (for delivery to application 112). When appropriate, store and forward service 121 can decrypt any encrypted portions of the forward message 161 (e.g., encrypted as per WS-Security) and can decode a digital signature to can confirm the integrity of forward message 161. Appropriately decrypted and authenticated portions of forward message 161 can be used to reconstitute the clear text of forward message 161.

When appropriate, for example, when a forward message does not contain an nq:Volatile header, an encoded transfer header (and potentially other encoded portions of a transfer message and an encoded application message can be stored at store and forward service or a store and forward layer. For example, store and forward service 121 can store encoded transfer header 152E and encoded application message 131E in temporary storage. Also when appropriate, a store and forward service or store and forward layer can acknowledge receipt of a forward message with a store and forward response. For example, store and forward service 121 can send forward response 162 (potentially encrypted and/or digitally signed) to store and forward layer 106 to acknowledge receipt of forward message 161. Store and forward layer 106 can receive and potentially decrypt and/or authenticate forward response 162. In response to forward response 162, store and forward layer 106 can remove encoded transfer header 152E (and potentially other portions of transfer message 151A) and encoded application message 131E from temporary storage.

Generally, a store and forward response can be of the format (before being secured):

```
<s:Envelope>
  <s:Header>
    <wsa:Action>
      http://schemas.testcorp.com/queuing/ForwardMessageResponse
    </wsa:Action>
```

-continued

```
    <wsa:To>xs:anyURI</wsa:To>
    <wsa:RelatesTo>original message ID</wsa:RelatesTo>
  </s:Header>
  <s:Body />
</s:Envelope>
```

Generally, elements in a store and forward response have the same meaning as previously described with respect to an enqueue message, an enqueue response, a transfer message, and a store and forward message. Additionally, the element /s:Envelope/s:Header/wsa:RelatesTo can be used to relate an store and forward response to a corresponding store and forward message. For example, forward response 162 can include a relates to value that identifies store and forward message 161. Store and forward layer 106 can receive forward response 162 indicating acknowledgement of forward message 161.

Method 300 includes an act of identifying a next store forward service (act 302). For example, store and forward service 121 can identify store and forward service 122 based on the location of store and forward service 121 relative to application 112 (or computer system 111) in computer architecture 100. Alternately, store and forward service 121 can identify a store and forward layer (e.g., store and forward layer 116). Store and forward service 121 can refer to the headers of forward message 161 when identifying a next store and forward service or store and forward layer.

Method 300 includes an act of configuring a new store and forward message (act 303). For example, store and forward service 121 can configure forward message 163. Forward message 163 can be configured in accordance with the same messaging protocol as application message 131. Accordingly, forward message 161 can also include a SOAP envelope. Forward message 163 can be for delivery to a next store and forward service (or store and forward layer) based on the position of application 102 (or computer system 101) relative to application 112 (or computer system 111) within computer architecture 100. Store and forward service 121 can copy appropriate headers, such as, for example, and nq:Volatile header, from forward message 161 to forward message 163.

Since composable protocol elements (e.g., addressing security, reliability, and transaction protocol elements) of application message 131 and transfer message 151A are encoded, the composable protocol elements of application message 131 and transfer message 151A do not interfere with the configuration of store and forward message 163. Accordingly, any composable protocol elements included in application message 131 and header 152 (or other portions of transfer message 151A) can be reused in forward message 163.

Method 300 includes an act of copying the body of the store and forward message into the body of the new store and forward message (act 304). For example, store and forward service 121 can copy encoded transfer header 152E (and potentially other portions of transfer message 151A) and encoded application message 131E from forward message 161 to forward message 163.

When appropriate, store and forward service 121 can encrypt and/or digitally sign forward message 163 before sending forward message 163 to a next store and forward service or other store and forward layer. Securing forward message 163 helps prevent unauthorized readers from accessing forward message 163. Forward messages 163 can be secured using any of a variety of different security mechanisms including WS-Security or transport layer security, such as, for example, Secure Sockets Layer ("SSL").

Method 300 includes an act of forwarding the new store and forward message to the next store and forward service (act 305). For example, store and forward service 121 can forward forward message 163 to store and forward service 122. Alternately, store and forward service 121 can forward forward message 163 to a store and forward layer (e.g., store and forward layer 116). When appropriate, store and forward service 121 can encrypt forward message 163 before sending forward message 163 to store and forward service 122. Generally, forward message 163 can be formatted similar to forward message 161.

Store and forward service 122 can receive forward message 163. When appropriate, store and forward service 122 can decrypt and/or verify the integrity of forward message 163 as previously described. Store and forward service can store encoded transfer header 152E and encoded application message 131E in temporary storage. Store and forward service 122 can also send forward response 164 (potentially encrypted and/or digitally signed) to store and forward service 121 to acknowledge receipt of forward message 163. Store and forward service 121 can receive and potentially decrypt and/or authenticate forward response 164. In response to forward response 164, store and forward service 121 can remove encoded transfer header 152E (and potentially other portions of transfer message 151A) and encoded application message 131E from temporary storage. Generally, forward response 164 can be formatted similar to forward response 162.

Store and forward service 122 can also configure store and forward message 166 (a new store and forward SOAP envelope) for delivery to store and forward layer 116. Store and forward layer 122 can process store and forward message 163 (e.g., identifying a next store and forward module, etc) similar to store and forward service 121's processing of forward message 161. Accordingly, store and forward service 122 can copy encoded transfer header 152E (and potentially other portions of transfer message 151A) and encoded application 131E from forward message 164 to forward message 166. Store and forward service 122 can send forward message 166 (potentially encrypted and/or digitally signed) to store and forward layer 116. Generally, forward message 166 can be formatted similar to forwards messages 161 and 163.

Since composable protocol elements (e.g., addressing, security, reliability, and transaction protocol elements) of application message 131 and transfer message 151A are encoded, the composable protocol elements of application message 131 and transfer message 151A do not interfere with the configuration of store and forward message 166. Accordingly, any composable protocol elements included in application message 131 and header 152 (and other portions of transfer message 151A) can be reused in forward message 166.

Figure 4:
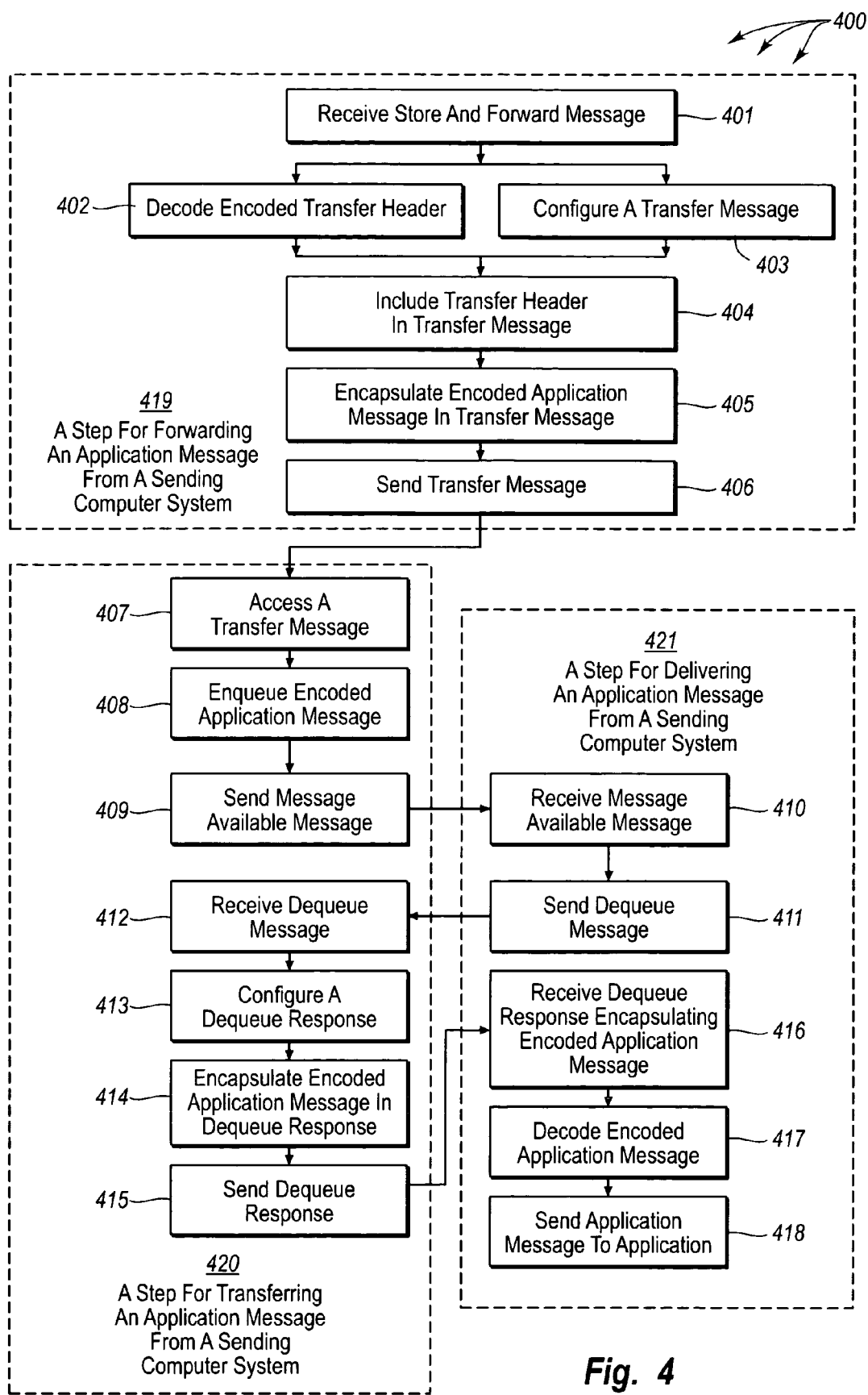
FIG. 4 illustrates an example flow chart of a method of reliably receiving a queued application message.

FIG. 4 illustrates an example flow chart of a method 400 of reliably receiving a queued application message. The method 400 will be described with respect to the modules and data in computer architecture 100.

Method 400 includes a functional result-oriented step for forwarding an application message from a sending computer system (step 419). Step 419 can include any corresponding acts for accomplishing the result of forwarding an application message from a sending computer system. However, in the illustrated example of FIG. 4, the step 419 includes a corresponding act of receiving a store and forward message (act 401).

For example, store and forward layer 116 can receive forward message 166. When appropriate, store and forward layer 116 can decrypt any encrypted portions of the forward message 163 (e.g., encrypted as per WS-Security) and can decode a digital signature to confirm the integrity of forward message 166. Appropriately decrypted and authenticated portions of forward message 166 can be used to reconstitute the clear text of forward message 166. Store and forward layer can store encoded transfer header 152E (and potentially other portions of transfer message 151A) and encoded application message 131E in temporary storage.

Store and forward layer 116 can also send forward response 167 (potentially encrypted and/or digitally signed) to store and forward service 122 to acknowledge receipt of forward message 166. Store and forward service 122 can receive and potentially decrypt and/or authenticate forward response 167. In response to forward response 167, store and forward service 122 can remove encoded header 152E (and potentially other portions of transfer message 151A) and encoded application message 131E from temporary storage. Generally, forward response 167 can be formatted similar to forward responses 164 and 162.

As previously described, forward message 166 can be a SOAP envelope that encapsulates encoded transfer header 152E (and potentially other portions of transfer message 151A) and encoded application message 131E (for delivery to application 112). Encoded application message 131E can be for delivery to application 112 based at least in part on application 102 and application 112 participating in a communication session.

Step 419 includes a corresponding act of decoding the encoded transfer header (act 402). For example, store and forward layer 116 can decode encoded transfer header 152E into a corresponding (unencoded) transfer header 152 (e.g., a /s:Envelope/s:Body/*/nq:TransferHeaders/nq:WrappedXmlBase64 element). Store and forward layer 116 can execute an unwrapping algorithm that takes an encoding type (e.g., base64), a content type (e.g., string), and an encoded transfer header as input and returns an (unencoded) transfer header. When appropriate, store and forward layer 116 can also decode other portions of transfer message 151A.

Step 419 includes an act of configuring a transfer message (act 403). For example, store and forward layer 116 can configure transfer message 151B. Transfer message 151B can be configured in accordance with the same messaging protocol as application message 131. Accordingly, transfer message 151B can also include a SOAP envelope. Transfer message 151B can identify a message session corresponding to the encoded application message 131E and can identify an application that is participating in the message session. For example, transfer message 151B can identify a message session between application 102 and application 112. In some embodiments, transfer message 151A is reconstituted from its encapsulation within forward message 166 and thus transfer message 151A and 151B are essentially the same transfer message.

Since composable protocol elements (e.g., addressing, security, reliability, and transaction protocol elements) of application message 131 are encoded, the composable protocol elements of application message 131 do not interfere with the configuration of transfer message 151B. Accordingly, any composable protocol elements included in application message 131 can be reused in forward message 151B. Generally, transfer message 151B can be formatted similar to transfer message 151A.

Step 419 includes a corresponding act of including the transfer header in the transfer message (act 404). For example, store and forward layer 116 can include transfer header 152 in transfer message 151B. Transfer header 152 can indicate how transfer message 151B is to be transferred to application 112.

Step 419 includes a corresponding act of encapsulating the encoded application message in the transfer message (act 405). For example, store and forward layer 116 can encapsulate encoded application message 131E in transfer message 151B. Store and forward layer 116 can optionally encrypt and/or digitally transfer message 151B. Securing transfer message 151B provides queue manager 118 some assurance of the authenticity of transfer message 151B and can prevent injecting additional messages into message queue Transfer message 151B can be secured using any of a variety of different security mechanisms, such as, for example, WS-Security.

Step 419 includes a corresponding act of sending the transfer message (act 406). For example, store and forward layer 116 can (appropriately encrypt and) send transfer message 151B to transfer layer 114. Generally, transfer message 151B can be formatted similar to transfer message 151A.

Method 400 includes a functional result-oriented step for transferring an application message from a sending computer system (step 420). Step 420 can include any corresponding acts for accomplishing the result of transferring an application message from a sending computer system. However, in the illustrated example of FIG. 4, the step 420 includes a corresponding act of processing a transfer message (act 407). For example, transfer layer 114 can process transfer message 151B. Transfer message 151B can encapsulate encoded application message 131E and be configured in accordance with the same messaging protocol as application message 131. Accordingly, transfer message 151B can also include a SOAP envelope.

Transfer layer 114 can decrypt and confirm the integrity of portions of transfer message 151B as appropriate (e.g., in accordance with WS-security), Decrypting transfer message 151B can reveal the clear text of message 151B. When appropriate, transfer layer 114 performs local processing to ensure in-order deliver, for example, in accordance with an nq:Sequence header having the Ordered attribute set to a true value ("1" or "true"). Transfer layer 114 compares the wsu:Expires header value to the current date-time to see if the application message 131 is still valid. If not, the receiving queue service can fail the request and generate an appropriate fault, such as, for example:

[Code] s12:Receiver
[Subcode] nq:MessageExpired
[Reason] "the message has expired"

In some embodiments, transfer layer 114 may need to generate an appropriate fault after it has accepted and acknowledged the message, if no queue listener dequeues the message before it expires. In these embodiments, the fault can be supplemented by copying the nq:Sequence and nq:QueueName headers to the fault's s:detail element.

Transfer layer 114 can also durably store encoded application message 131E in message queue 117.

Step 420 includes a corresponding act of enqueueing the encoded application message (act 408). For example, transfer layer 114 can enqueue encoded application message 131E in message queue 117. Transfer layer 114 can retain queuing headers (nq:QueueName; wsu:Expires; and nq:Sequence) and the nq:ApplicationMessage body element of the TransferMessage envelope for further processing (e.g., dequeueing for delivery to application 112).

In some embodiments, queue listeners register interest in receiving notifications about sessions available on a queue. For example, queue listener 113 can send registration message 191 to queue manager 118 to register an interest in messages available on message queue 117. Registration message 191 can represent that application 112 is interested in sessions and messages from application 102. Generally, a registration message can be of the format (before being secured):

```
<s:Envelope ...>
  <s:Header>
    <wsa:Action>
      http://schemas.microsoft.com/queuing/Listen
    </wsa:Action>
    <wsa:To>xs:anyURI</wsa:To>
    <wsa:ReplyTo>wsa:EndpointReference</wsa:ReplyTo>
    <wsa:MessageID>xs:anyURI</wsa:MessageID>
    <nq:QueueName>xs:anyURI</nq:QueueName>
    <nq:Volatile /> ?
    ...
  </s:Header>
  <s:Body>
    <nq:Listen>
      <nq:Filter>XPath predicate</nq:Filter> ?
    </nq:Listen>
  </s:Body>
</s:Envelope>
```

Generally, elements in a registration message have the same meaning as previously described with respect to an enqueue message, an enqueue response, a transfer message, a store and forward message, and a store and forward response. Additionally, the /s:Envelope/s:Header/nq:QueueName element can be used to indicate the name (URI) of the logical queue the queue listener wants to listen to. When there is no queue named by the nq:QueueName value in the register request, the queue service can generate a appropriate fault:

[Code] s12:Sender
[Subcode] nq:NoSuchQueue
[Reason] "no such queue exists"

The /s:Envelope/s:Header/nq:Volatile element can be used to indicate that the queue listener is interested in application sessions that are considered volatile. That is, to indicate an interest in application sessions whose messages may not be written to persistent storage. If this element does not appear, then the listener will only be notified of durable application sessions. The /s:Envelope/s:Body/*/nq:Filter element can be used to indicate an XML Path Language ("XPath") predicate that a queue listener uses to restrict the application sessions it is interested in. The predicate can be applied to the first message in an application session and the queue listener will only be notified if the predicate evaluates to true. If this element does not appear, then the queue listener can be notified of all application sessions.

In response to receiving a registration message from a queue listener, a corresponding queue manager 118 can generate and send a registration response. For example, in response to receiving registration message 191, queue manager 118 can send registration response 192 to queue listener 113. Registration response 192 indicates a successful registration. Generally, a registration response can be of the format (before being secured):

```
<s:Envelope ...>
  <s:Header>
    <wsa:Action>
      http://schemas.microsoft.com/queuing/ListenResponse
```

```
        </wsa:Action>
        <wsa:To>xs:anyURI</wsa:To>
        <wsa:RelatesTo>request message ID</wsa:RelatesTo>
        <wsa:MessageID>xs:anyURI</wsa:MessageID>
        ...
    </s:Header>
    <s:Body>
        <nq:ListenResponse>
            <nq:Identifier>xs:anyURI</nq:Identifier>
        </nq:ListenResponse>
    </s:Body>
</s:Envelope>
```

Generally, elements in a registration response have the same meaning as previously described with respect to an enqueue message, an enqueue response, a transfer message, a store and forward message, a store and forward response, and a registration message. Additionally, the /s:Envelope/s:Body/*/nq:Identifier element can be used contain a URI that identifies a specific Listen context. For example, it correlates to the Filter that was provided in the Listen request. This identifier is used when the listener is notified of the availability of a new application session or session message and when the listener accepts an application session.

Further, it may be that application message 131 is the initial message in a communication session. Thus, in response to receiving application message 131 (a message queue listener 113 has registered for), queue manager 118 can determine that queue listener 113 has registered an interest in application message 131. For example, queue manager 118 can match message 113 to an XPath predicate included in registration message 191. Thus in response to receiving message 131, queue manager 118 can configure and send session available message 172 to queue listener 113. Generally, a session available message (e.g., a SOAP envelope) can include a header of the following format:

```
<nq:SessionAvailable>
    <nq:QueueName>xs:anyURI</nq:QueueName>
    <nq:Identifier>xs:anyURI</nq:Identifier>
<nq:SessionAvailable>
```

Generally, elements in a session available message have the same meaning as previously described with respect to an enqueue message, an enqueue response, a transfer message, a store and forward message, a store and forward response, a registration message, and a registration response. Additionally, the nq:SessionAvailable/nq:QueueName element can be used to indicate the URI that names the logical queue that the session is available on. The nq:SessionAvailable/nq:Identifier can be used to indicate an identifier returned in a registration response to the queue listener, which the queue listener has successfully accepted, and on which a message is available.

Queue listener 113 can receive session available message 172. In response to session available message 172, queue listener configures and sends session accept message 173. Accept message 173 contains an enumeration context (e.g., according to WS-enumeration) used to dequeue messages. Generally, a session accept message can be of the format (before being secured):

```
<s:Envelope...>
    <s:Header>
        <wsa:Action>
            http://schemas.microsoft.com/queuing/Accept
        </wsa:Action>
        <wsa:To>xs:anyURI</wsa:To>
        <wsa:ReplyTo>wsa:EndpointReference</wsa:ReplyTo>
        <wsa:MessageID>xs:anyURI</wsa:MessageID>
        <nq:QueueName>xs:anyURI</nq:QueueName>
        ...
    </s:Header>
    <s:Body>
        <nq:Accept>
            <nq:Identifier>xs:anyURI</nq:Identifier>
            <nq:MaxTime>xs:duration</nq:MaxTime> ?
        </nq:Accept>
    </s:Body>
</s:Envelope>
```

Generally, elements in a session accept message have the same meaning as previously described with respect to an enqueue message, an enqueue response, a transfer message, a store and forward message, a store and forward response, a registration message, a registration response, and a session available message. Additionally, the /s:Envelope/s:Header/nq:QueueName element contains the name (URI) of the logical queue the listener wants to receive messages on. If there is no queue named by the nq:QueueNamevalue in the registration request, the queue manager can generate the following appropriate fault:

[Code] s12:Sender
[Subcode] nq:NoSuchQueue
[Reason] "no such queue exists"

The /s:Envelope/s:Body/*/nq:Identifier element can be used to contain the identifier returned in a registration response to the queue listener. If an nq:Identifier value in the request is not recognized by the receiving queue service, the queue service can generate the following appropriate fault:

[Code] s12:Sender
[Subcode] nq:NoSuchListener
[Reason] "no such Listen identifier exists"

The /s:Envelope/s:Body/*/nq:MaxTime element can be used to indicate the maximum amount of time the queue listener is configured to wait for an application session to become available. When this element is present, the receiving queue service can generate the following appropriate fault if no application session that matches the registration identifier becomes available by the end of the duration (measured from when the receiving queue service processes the session accept message):

[Code] s12:Receiver
[Subcode] nq:NoSessionAvailable
[Reason] "no matching application session available"

Note that the queue listener may not rely on precise timing of this fault, as the receiving queue service may not be able to detect the situation and issue the fault immediately at the expiration of the duration.

In response to session accept message 173, queue manager 118 can configure and send session accept response 193. Generally, a session accept response can be of the format (before being secured):

```
<s:Envelope...>
    <s:Header>
        <wsa:Action>
            http://schemas.microsoft.com/queuing/AcceptResponse
        </wsa:Action>
        <wsa:To>xs:anyURI</wsa:To>
```

```
        <wsa:ReplyTo>wsa:EndpointReference</wsa:ReplyTo>
        <wsa:MessageID>xs:anyURI</wsa:MessageID>
        ...
    </s:Header>
    <s:Body>
        <nq:AcceptResponse>
            <wsen:EnumerationContext>...</wsen:EnumerationContext>
        </nq:AcceptResponse>
    </s:Body>
</s:Envelope>
```

Generally, elements in a session accept response have the same meaning as previously described with respect to an enqueue message, an enqueue response, a transfer message, a store and forward message, a store and forward response, a registration message, a registration response, a session available message, and a session accept message. Further, the /s:Envelope/s:Body/*/wsen:EnumerationContext element can be used to contain an XML representation of a new enumeration context, for example, in accordance with WS-Enumeration. The receiving application can pass this XML data in dequeue message requests for this application session, until and unless a dequeue response updates the enumeration context.

Referring now back to FIG. 4, Step 420 includes an act of sending a message available message (act 409). For example, queue manager 118 can send (potentially encrypted and/or digitally signed) message available message 174 to queue listener 113. Message available message 174 indicates to queue listener 113 that encoded application message 131 has been queued. Message available message 174 can be sent to queue listener 113 after queue listener 113 has registered an interest in messages queued at message queue 117 and/or after queue listener 113 has accepted a corresponding session. Generally, a message available message (e.g., a SOAP envelope) can include a message available header of the following format:

```
<nq:MessageAvailable>
    <nq:QueueName>xs:anyURI</nq:QueueName>
    <nq:Identifier>xs:anyURI</nq:Identifier>
<nq:MessageAvailable>
```

The nq:MessageAvailable/nq:QueueName element can be used to indicate the URI that names the logical queue that the message is available on. The nq:MessageAvailable/nq:Identifier can be used to indicate an identifier returned in a registration response to the queue listener, which the queue listener has successfully accepted, and on which a message is available. In some embodiments, a message available header may be added to a session accept response or a dequeue response, or it may be sent as a stand-alone one-way message, with an empty body. If it is sent as a stand-alone message, it can be sent with a wsa:Action of http://schemas.testcorp.com/queuing/MessageAvailable. If sent as a header on another message, multiple MessageAvailable headers may be included in a single message; they may also be mixed with one or more session available headers.

Method 400 includes a functional result-oriented step for delivering an application message from a sending computer system (step 421). Step 421 can include any corresponding acts for accomplishing the result of delivering an application message from a sending computer system. However, in the illustrated example of FIG. 4, the step 421 includes a corresponding act of receiving a message available message (act 410). For example, queue listener 113 can receive message available message 174 indicating that message 131 is available for delivery to application 112. When appropriate, queue listener can decrypt and/or verify the integrity of message available message 174.

Step 421 includes a corresponding act of sending a dequeue message (act 411). For example, queue listener 113 can send (potentially encrypted and/or digitally signed) dequeue message 176 to queue manager 118. Dequeue message 176 can indicate that application message 131 is to be dequeued for delivery to application 112. Dequeue message 176 can include elements that identify message queue 117 (e.g., nq:QueueName) and application message 131 (e.g., nq:Sequence). Generally, a dequeue message (e.g., a SOAP envelope) can be of the format of a WS-Enumeration pull message having additional constraints.

Generally, elements in a dequeue message have the same meaning as previously described with respect to an enqueue message, an enqueue response, a transfer message, a store and forward message, a store and forward response, a registration message, a registration response, a session available message, a session accept message, and message available message. Further, a dequeue message can include a /s:Envelope/s:Header/nq:AbortCount element that can be used to indicate a retry count for poisoned-message detection. A dequeue message can include a /s:Envelope/s:Header/wscoor:CoordinationContext element that can be used to indicate an atomic transaction contest (e.g., when dequeue message 176 and dequeue response 177 are part of a two-phase commit protocol). A dequeue message can include a /s:Envelope/s:Body/*/wsen:MaxElements elements that can be used to indicate whether or not multiple elements can be dequeued in one dequeue request.

If the enumeration context passed in the dequeue message is not valid, the receiving queue service can fail the request and generate the following fault, as specified in WS-Enumeration:

[Code] s12:Sender
[Subcode] wsen:InvalidEnumerationContext
[Reason] "invalid enumeration context"

Step 420 includes a corresponding act of receiving a dequeue message (act 412). For example, queue manager 118 can receive dequeue message 176 from queue listener 113. When appropriate, queue manager 118 can decrypt and/or verify the integrity of dequeue message 176. Step 420 includes a corresponding act of configuring a message response (act 413). For example, queue manager 118 can configure dequeue response 177. Dequeue response 177 can be configured in accordance with the same messaging protocol as application message 131. Accordingly, dequeue response can also include a SOAP envelope. Queue manager 118 can process transfer message 151B in accordance with WS-Addressing and WS-Coordination when configuring dequeue response 177. Queue manager 118 can copy the session ID header, if present, from the nq:TransferHeader element of transfer message 151B into dequeue response 177. If the session ID header has a LastMessage flag, queue manager 118 can add a wsen:EndOfSequence element to the body of dequeue response 177.

Since composable protocol elements (e.g., addressing, security, reliability, and transaction protocol elements) of application message 131 are encoded, the composable protocol elements of application message 131 do not interfere with the configuration of dequeue response 177. Accordingly, any composable protocol elements included in application message 131 can be reused in dequeue response 177.

Generally, a dequeue response (e.g., a SOAP envelope) can be of the format of a WS-Enumeration pull response message having additional constraints. Generally, elements in a dequeue response have the same meaning as previously described with respect to an enqueue message, an enqueue response, a transfer message, a store and forward message, a store and forward response, a registration message, a registration response, a session available message, a session accept message, a message available message, and a dequeue message. Further, a dequeue response can include a /s:Envelope/s:Header/nq:Sequence element that can contain an indication if an enumeration context contained in a dequeue message was associated with an application session. A dequeue response can include a /s:Envelope/s:Body/wsen:PullResponse/wsen:Items/nq:ApplicationMessage/nq: WrappedXmlBase64 element that contains an application SOAP envelope of the application message, appropriately wrapped. A dequeue response can include a /s:Envelope/s:Body/wsen:PullResponse/wsen:EndOfSequence element that can be used to indicate the last message in a sequence or that there will not be additional messages in this context for other reasons.

Step 420 includes a corresponding act of encapsulating the encoded application message in the dequeue response (act 414). For example, queue manager 118 can encapsulate encoded application message 131E in dequeue response 177. Subsequent to encapsulating encoded application message 131E, dequeue response 177 can be encrypted and/or digitally signed. Digitally signing dequeue response 177 provides queue listener 113 some assurance of the authenticity of dequeue response 177. Dequeue response 177 can be secured using any of a variety of different security mechanisms including WS-Security or transport layer security, such as, for example, Secure Sockets Layer ("SSL").

Step 420 includes a corresponding act of sending the dequeue response for delivery to the application (act 415). For example, queue manager 118 can send dequeue response 177 to queue listener 113. Step 421 includes a corresponding act of receiving a dequeue response encapsulating an encoded application message (act 416). For example, queue listener 113 can receive dequeue response 177 encapsulating encoded application message 131E. When appropriate, queue listener 113 can decrypt and/or verify the integrity of dequeue response 177.

Step 421 includes a corresponding act of decoding the encoded application message (act 417). For example, queue listener 113 can decode encoded application message 131E into application message 131. Queue listener 113 can execute an unwrapping algorithm that takes an encoding type (e.g., base64), a content type (e.g., string), and an encoded application message as input and returns an (unencoded) application message as output.

Step 421 includes a corresponding act of sending the application message to the application (act 418). For example, queue listener 113 can send application message 131 to application 112. If application 112 is not active, queue listener 113 can send wakeup notification 178 to a container environment that manages application 112.

Queue listener 103 can optionally encrypt and/or digitally sign application message 131 as well. Encrypting and/or digitally signing application message 131 helps ensure that the application message 131 is not modified or intercepted during transmission. Application message 131E can be secured using any of a variety of different security mechanisms, such as, for example, WS-Security.

Application 112 receives and processes application message 112. When appropriate, application 112 can decrypt application message 131 to reveal the clear text of application message 131. Application 112 can also decode a corresponding digital signature to verify the integrity of application message 131.

Applications that read messages from a queue can be hosted in a container. An application may not be running for a variety of reasons, such as, for example, the application has failed, the application has idled out, the application has recycled, etc. A wakeup notification provides for notifying a hosting environment of the availability of messages in the queue. The hosting environment can use a wakeup notification to start the application, start another instance of the application, or schedule the application for running. Generally, a wakeup notification can be of the format (before being secured):

```
<s:Envelope ... >
   <s:Header>
      <wsa:Action>
         http://schemas.testcoep.com/queuing/Wakeup
      </wsa:Action>
      <wsa:To>xs:anyURI</wsa:To>
      <nq:QueueName>xs:anyURI</nq:QueueName>
      <nq:Volatile /> ?
      ...
   </s:Header>
   <s:Body />
</s:Envelope>
```

Generally, elements in a wakeup notification have the same meaning as previously described with respect to an enqueue message, an enqueue response, a transfer message, a store and forward message, a store and forward response, a registration message, a registration response, a session available message, a session accept message, a message available message, a dequeue message, and a dequeue response. Additionally, a wakeup notification message can include a /s:Envelope/s:Header/nq:QueueName element that can contain a name (URI) of the logical queue containing messages to be processed. A wakeup notification message can include a /s:Envelope/s:Header/nq:Volatile element that can be used to indicate that the queue messages waiting to be processed are volatile.

When appropriate, a sending side queue manager (e.g., queue manager 108) can send a cancel transfer message to a receiving side queue manager (e.g., queue manager 118) to close holes in an acknowledgment sequence. A sending side queue manager generates a cancel transfer operation when it determines that one or more MessageNumbers in a WS-ReliableMessaging sequence will never be received at the receiving side queue manager. When the receiving queue manager receives a cancel transfer message, the receiving side queue manager continues processing as if the identified messages have been received. The receiving side queue manager can acknowledge the one or more MessageNumbers on the WS-ReliableMessaging sequence as they had actually been received. Generally, a cancel transfer message can be of the format (before being secured):

```
<s:Envelope>
   <s:Header>
      <wsa:Action>
         http://schemas.microsoft.com/queuing/CancelTransfer
      </wsa:Action>
      <wsa:To>xs:anyURI</wsa:To>
```

-continued

```
    <nq:QueueName>xs:anyURI</nq:QueueName>
    <wsa:ReplyTo>wsa:EndpointReferenceType</wsa:ReplyTo>
    <wsa:MessageID>xs:anyURI</wsa:MessageID>
  </s:Header>
  <s:Body>
    <nq:CancelTransfer>
      <wsu:Identifier>xs:anyURI</wsu:Identifier>
      <wsrm:AcknowledgementRange
          Upper="unsignedLong"
          Lower="unsignedLong"/> +
    </nq:CancelTransfer>
  </s:Body>
</s:Envelope>
```

Generally, elements in a cancel transfer message have the same meaning as previously described with respect to an enqueue message, an enqueue response, a transfer message, a store and forward message, a store and forward response, a registration message, a registration response, a session available message, a session accept message, a message available message, a dequeue message, a dequeue response, and a wake up notification. Further, a cancel transfer message can be configured to respect the constraints specified for a transfer message.

A cancel transfer message can include a /s:Envelope/s:Body/*/wsu:Identifier element that can contain a URI conformant with [RFC2396] that uniquely identifies the WS-RM Sequence being referenced by this message. A cancel transfer message can include a /s:Envelope/s:Body/*/wsrm:AcknowledgementRange element that can be used to indicate a range of WS-RM message Sequence MessageNumbers that the receiving queue service should treat as if they were received because they will never be sent. A cancel transfer message can include 1 or more Envelope/s:Body/*/wsrm:AcknowledgementRange elements. A cancel transfer message can include a /s:Envelope/s:Body/*/wsrm:AcknowledgementRange/@Upper element that can be used to indicate the message number of the highest contiguous message in a Sequence range. A cancel transfer message can include /s:Envelope/s:Body/*/wsrm:AcknowledgementRange/@(Lower that can be used to indicate the message number of the lowest contiguous message in a Sequence range.

After the transfer of application messages for a session is complete, a queue channel may close. However, a queue channel can send a detach message (e.g., including a session identifier and a queue name) to a sending side queue manager to indicate that the session is to remain open. The sending side queue manager can hold the session open and send a detach response acknowledging that the session is to remain open.

To mark the end of a session, a queue channel can add a LastMessage element to the nq:Sequence header of the last message for the session. In response to detecting a LastMessage element, a sending side queue manager can discard any maintained state for the application session after the last message is sent. In response to detecting a LastMessage element, a receiving side queue manager can use the Message Number element to detect that is has received all of the messages for a session. When a session is completed, the receiving side queue manager can deliver the last message for the session in a dequeue response and can include a wsen:EndOfSequence element in the dequeue response body. After delivering the last message, the receiving side queue manager can discard any maintained state for the application session. When a queue listener receives a wsen:EndOfSequence element the enumeration context becomes invalid and can be discarded.

Figure 5:
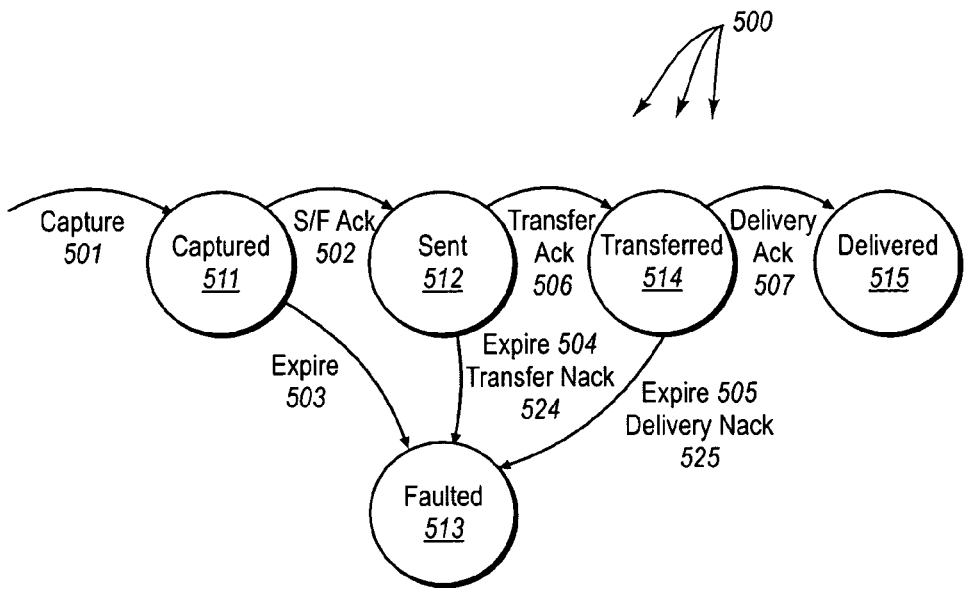
FIG. 5 illustrates an example state diagram of different reliable messaging states at a sending computer system.

FIG. 5 illustrates an example state diagram 500 of different reliable messaging states at a sending computer system. It should be understood that the states depicted in state diagram 500 are per-message. A queue manager can have a plurality of messages that it is transferring and can associate a unique state machine with each of the plurality of messages.

For example, a message controlled by a sending side queue manager, such as, for example, queue manager 108, can transition to captured state 511 after capture 501 (i.e., after capturing a message). After initiating a transfer, the sending side queue manager waits for store and forward acknowledgement. Until a store and forward acknowledgment is received, the sending side queue manager keeps retrying the send.

When store and forward acknowledgement 502 is received, the controlled message transitions to sent state 512. The sending side queue manager then waits for a transfer acknowledgement. When transfer acknowledgement 506 is received, the controlled message transitions to transferred state 514. The sending side queue manager then waits for a delivery acknowledgement from the destination queue manager. When delivery acknowledgment 507 (a positive acknowledgment) is received, the control message transitions to delivered state 515 and can be deleted from a corresponding queue.

After a controlled message transitions to captured state 511, a sending side queue manager can be configured to wait a specified period of time to receive a store and forward acknowledgment. When the specified period of time for receiving a store and forward acknowledgment expires 503, the controlled message transitions to faulted state 513. After a controlled message transitions to sent state 512, a sending side queue manager can be configured to wait a specified period of time to receive a transfer acknowledgment. When the specified period of time for receiving a transfer acknowledgment expires 504, the controlled message transitions to faulted state 513. Further, it may be that the sending side queue manager receives transfer negative acknowledgment 524 that causes the controlled message to transition to faulted state 513.

After controlled message transitions to transferred state 514, a sending side queue manager can be configured to wait a specified period of time to receive a delivery acknowledgment. When the specified period of time for receiving a delivery acknowledgment expires 505, the controlled message transitions to faulted state 513. Further, it may be that the sending side queue manager receives a delivery negative acknowledgment 525 that causes the controlled message to transition to faulted state 513. Transfer and delivery acknowledgments and negative acknowledgment can be sent to an error service running in the sending side queue manager. If a user has requested no transfer assurances, controlled messages can be deleted after a store and forward acknowledgement is received.

Figure 6:
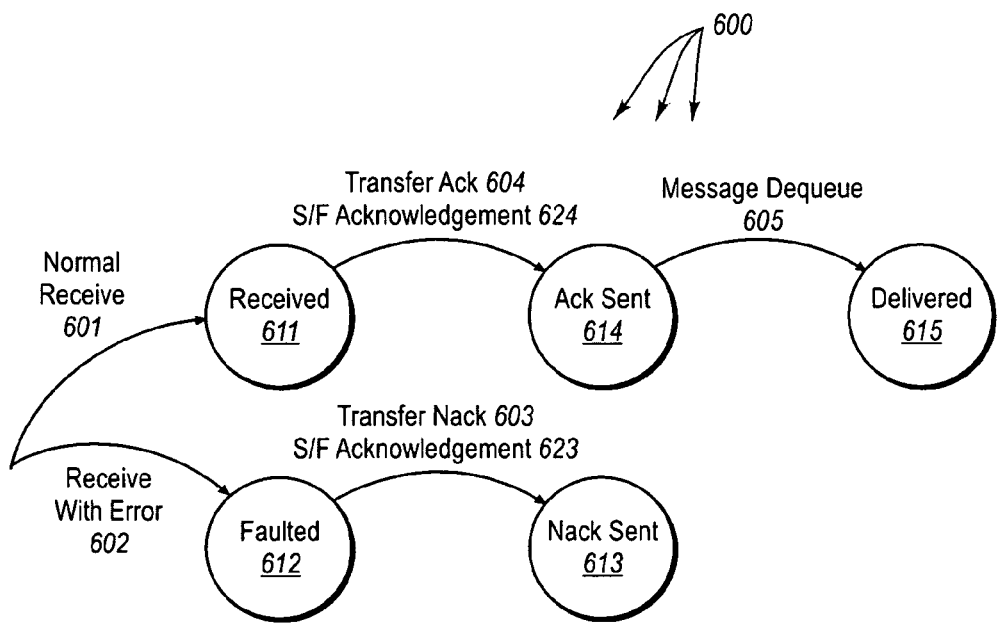
FIG. 6 illustrates an example state diagram of different reliable messaging states at a receiving computer system.

FIG. 6 illustrates an example state diagram of different reliable messaging states at a receiving computer system. It should be understood that the states depicted in state diagram 600 are per-message. For example, a message controlled by a receiving side queue manager, such as, for example, queue manager 118, can transition to received state 611 after normal receive 601 (i.e., normal reception of a message). A successfully received message can be captured in a message queue. The receiving side queue manager can also send a store and forward acknowledgment 624 back to the previous store and forward service or store and forward layer. After sending a store and forward acknowledgment 624, the receiving side queue manager can send transfer acknowledgment 604. The receiving side queue manager then queues the message.

After sending both store and forward acknowledgment 624 and transfer acknowledgment 604, a controlled message transitions to acknowledgement sent state 614. When the message is dequeued 605, the receiving side queue manager can transfer to a delivered state. After the message is consumed by the receiving application, the controlled message transitions to delivered state 615.

On the other hand, a controlled message can transition to faulted state 612 after receive with errors 602 (i.e., a message is received with errors, such as, for example, no such queue here or sender not authorized to send to this queue). The receiving side queue manager can also send a store and forward acknowledgment 623 back to the previous store and forward service or store and forward layer. After sending a store and forward acknowledgment 603, the receiving side queue manager can send transfer negative acknowledgment 603 (to potentially prompt retransmission). After sending both, store and forward acknowledgment 624 and transfer negative acknowledgment 603, a controlled message can transition to negative acknowledgement sent state 613. The transfer and delivery ACKs and NACKs are sent to an error service hosted at the sending side queue manager.

Figure 7:
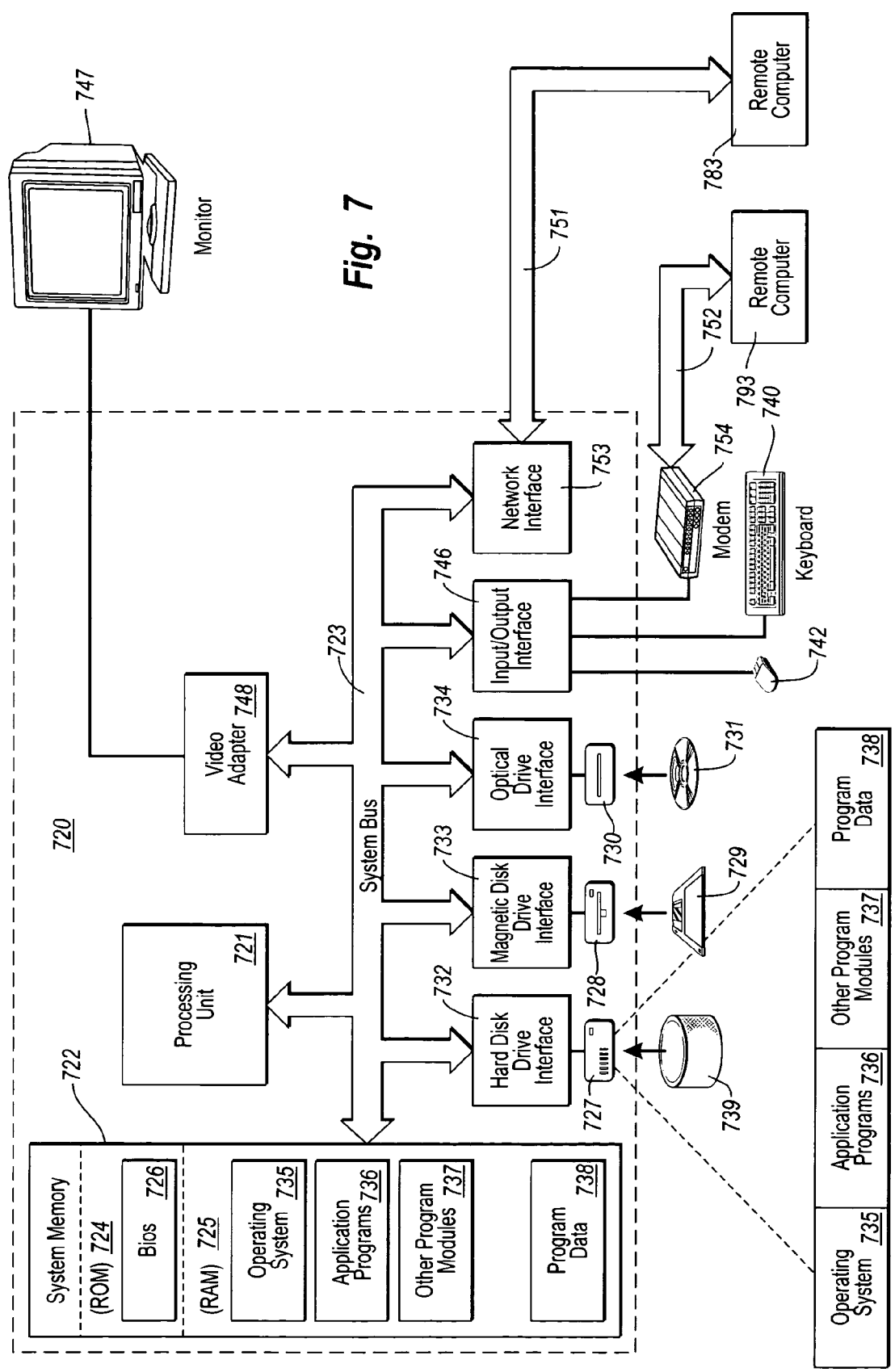
FIG. 7 illustrates a suitable operating environment for the principles of the present invention.

FIG. 7 illustrates a suitable operating environment for the principles of the present invention. FIG. 7 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 7, an example system for implementing the invention includes a general-purpose computing device in the form of computer system 720, including a processing unit 721, a system memory 722, and a system bus 723 that couples various system components including the system memory 722 to the processing unit 721. Processing unit 721 can execute computer-executable instructions designed to implement features of computer system 720, including features of the present invention. The system bus 723 may be any of several types of bus structures including a memory bus or memory controller, a peripheral bus, and a local bus using any of a variety of bus architectures. The system memory includes read only memory ("ROM") 724 and random access memory ("RAM") 725. A basic input/output system ("BIOS") 726, containing the basic routines that help transfer information between elements within computer system 720, such as during start-up, may be stored in ROM 724.

The computer system 720 may also include magnetic hard disk drive 727 for reading from and writing to magnetic hard disk 739, magnetic disk drive 728 for reading from or writing to removable magnetic disk 729, and optical disk drive 730 for reading from or writing to removable optical disk 731, such as, or example, a CD-ROM or other optical media. The magnetic hard disk drive 727, magnetic disk drive 728, and optical disk drive 730 are connected to the system bus 723 by hard disk drive interface 732, magnetic disk drive-interface 733, and optical drive interface 734, respectively. The drives and their associated computer-readable media provide non-volatile storage of computer-executable instructions, data structures, program modules, and other data for the computer system 720. Although the example environment described herein employs magnetic hard disk 739, removable magnetic disk 729 and removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 739, magnetic disk 729, optical disk 731, ROM 724 or RAM 725, including an operating system 735, one or more application programs 736, other program modules 737, and program data 738. A user may enter commands and information into computer system 720 through keyboard 740, pointing device 742, or other input devices (not shown), such as, for example, a microphone, joy stick, game pad, scanner, or the like. These and other input devices can be connected to the processing unit 721 through input/output interface 746 coupled to system bus 723. Input/output interface 746 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 747 or other display device is also connected to system bus 723 via video interface 748. Other peripheral output devices (not shown), such as, for example, speakers and printers, can also be connected to computer system 720.

Computer system 720 is connectable to networks, such as, for example, an office-wide or enterprise-wide computer network, a home network, an intranet, and/or the Internet. Computer system 720 can exchange data with external sources, such as, for example, remote computer systems, remote applications, and/or remote databases over such networks.

Computer system 720 includes network interface 753, through which computer system 720 receives data from external sources and/or transmits data to external sources. As depicted in FIG. 7, network interface 753 facilitates the exchange of data with remote computer system 783 via link 751. Network interface 753 can logically represent one or more software and/or hardware modules, such as, for example, a network interface card and corresponding Network Driver Interface Specification ("NDIS") stack. Link 751 represents a portion of a network (e.g., an Ethernet segment), and remote computer system 783 represents a node of the network.

Likewise, computer system. 720 includes input/output interface 746, through which computer system 720 receives data from external sources and/or transmits data to external sources. Input/output interface 746 is coupled to modem 754 (e.g., a standard modem, a cable modem, or digital subscriber line ("DSL") modem) via link 759, through which computer system 720 receives data from and/or transmits data to external sources. As depicted in FIG. 7, input/output interface 746 and modem 754 facilitate the exchange of data with remote computer system 793 via link 752. Link 752 represents a portion of a network and remote computer system 793 represents a node of the network.

While FIG. 7 represents a suitable operating environment for the present invention, the principles of the present invention may be employed in any system that is capable of, with suitable modification if necessary, implementing the principles of the present invention. The environment illustrated in FIG. 7 is illustrative only and by no means represents even a small portion of the wide variety of environments in which the principles of the present invention may be implemented.

In accordance with the present invention, modules including applications, queue channels, queue listeners, queue managers, transfer layers, store and forward layers, and store and forward services as well as associated data, including application messages, encoded application messages, enqueue messages, enqueue responses, transfer messages, encoded transfer headers, store and forward messages, store and forward responses, session available messages, accept messages, message available messages, dequeue messages, dequeue responses, wake up notifications, and active session IDs, can be stored and accessed from any of the computer-readable media associated with computer system 720. For example, portions of such modules and portions of associated program data may be included in operating system 735, application programs 736, program modules 737 and/or program data 738, for storage in system memory 722.

When a mass storage device, such as, for example, magnetic hard disk 739, is coupled to computer system 720, such modules and associated program data may also be stored in the mass storage device. In a networked environment, program modules depicted relative to computer system 720, or portions thereof, can be stored in remote memory storage devices, such as, system memory and/or mass storage devices associated with remote computer system 783 and/or remote computer system 793. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system that is network connectable along with one or more other computer systems to a network, a method of reliably enqueing a message, the method comprising:
   an act of receiving an application message configured in accordance with a messaging protocol, the application message including one or more composable protocol elements selected from the group consisting of addressing, security, reliability, and transaction protocol elements;
   an act of encoding the application message into a corresponding encoded application message to obscure the one or more composable protocol elements included in the application message;
   an act of reusing the one or more composable protocol elements included in the application message in an enqueue message to configure the enqueue message in accordance with the messaging protocol, the enqueue message identifying a message queue that is to queue the application message;
   an act of encapsulating the encoded application message in the enqueue message such that the one or more composable protocol elements encoded in the application message are obscured and do not interfere with reusing the one or more composable protocol elements in the enqueue message;
   an act of sending the enqueue message to a queue manager that controls the identified queue such that the application message can be queued for delivery to a receiving computer system; and
   an act of receiving an enqueue response from the queue manager.

2. The method as recited in claim 1, wherein the act of receiving an application message configured in accordance with a messaging protocol comprises an act of a queue channel receiving a subroutine call including the application message.

3. The method as recited in claim 1, wherein the act of receiving an application message configured in accordance with a messaging protocol comprises an act of receiving a SOAP envelope.

4. The method as recited in claim 1, wherein the act of encoding the application message into a corresponding encoded application message comprises an act of binary encoding the application message.

5. The method as recited in claim 4, wherein the act of binary encoding the application message comprises an act of base64 encoding the application message.

6. The method as recited in claim 1, wherein the act of encoding the application message into a corresponding encoded application message comprises an act of text encoding the application message.

7. The method as recited in claim 1, wherein the act of encoding the application message into a corresponding encoded application message comprises:
   an act of providing the received application message, an encoding type, and a content type as input to a wrapping algorithm; and
   an act of receiving an encoded application message as output from the wrapping algorithm.

8. The method as recited in claim 1, further comprising:
   an act of encoding a session identifier along with the application message.

9. The method as recited in claim 1, wherein the act of configuring an enqueue message in accordance with the messaging protocol comprises an act of configuring a SOAP envelope.

10. The method as recited in claim 1, wherein the act of configuring an enqueue message in accordance with the messaging protocol comprises an act of configuring the enqueue message to identify a message session corresponding to the application message.

11. The method as recited in claim 1, wherein the act of reusing the one or more composable protocol elements included in the application message comprises an act of reusing at least one composable protocol element from a SOAP application message.

12. The method as recited in claim 1, wherein the act of encapsulating the encoded application message in the enqueue message comprises an act of encapsulating an encoded SOAP application message in a SOAP enqueue message.

13. The method as recited in claim 12, wherein the act of encapsulating an encoded SOAP application message in a SOAP enqueue message comprises an act of including decoding information for decoding the encoded SOAP application message within the SOAP enqueue message.

14. The method as recited in claim 1, wherein the act of sending the enqueue message to a queue manager that controls the identified queue comprises an act of using an atomic transaction context to coordinate enqueueing the application message with other application state changes.

15. The method as recited in claim 1, wherein the act of sending the enqueue message to a queue manager that controls the identified queue comprises an act of participating in a two-phase commit.

16. The method as recited in claim 1, wherein the act of sending the enqueue message to a queue manager that controls the identified queue comprises an act of using a reliable messaging protocol to send the enqueue message.

17. The method as recited in claim 1, further comprising an act of performing at least one of encrypting and digitally signing the encoded application message prior to encapsulating the application message.

18. The method as recited in claim 1, further comprising an act of performing at least one of encrypting and digitally signing the enqueue message prior to sending the enqueue message.

19. The method as recited in claim 1, wherein the act of receiving an enqueue response comprises an act of using a reliable messaging protocol to receive the enqueue response.

20. The method as recited in claim 1, wherein the act of receiving an enqueue response comprises an act of using an atomic transaction context to coordinate enqueueing the application message with other application state changes.

21. The method as recited in claim 1, wherein the act of receiving an enqueue response comprises an act of participating in a two-phase commit.

22. The method as recited in claim 1, wherein the act of receiving an enqueue response comprises an act of receiving an enqueue response that is at least one of: encrypted and digitally signed.

23. At a computer system that is network connectable along with one or more other computer systems to a network, a method of reliably transferring a message, the method comprising:
   an act of receiving a message available message indicating that an application message, configured in accordance with a messaging protocol, is available for delivery to an application, the application message including one or more composable protocol elements selected from the group consisting of addressing, security, reliability, and transaction protocol elements, the application message being encoded to obscure the one or more composable protocol elements included in the application message;
   an act of sending a dequeue message in response to the message available message, the dequeue message indicating that the encoded application message is to be dequeued for delivery to the application;
   an act of receiving a dequeue response, the dequeue response configured in accordance with the messaging protocol, the dequeue response encapsulating the encoded application message and reusing the one or more composable protocol elements encoded in the application message such that the one or more encoded composable protocol elements do not interfere with reusing the one or more composable protocol elements in the dequeue response;
   an act of decoding the encoded application message into the application message; and
   an act of sending the application message to the application.

24. The method as recited in claim 23, wherein the act of receiving a message available message indicating that an application message is available for delivery comprises an act of a queue listener receiving a message available message.

25. The method as recited in claim 23, wherein the act of receiving a message available message indicating that an application message is available for delivery comprises an act of receiving a SOAP message available message indicating that a SOAP application message is available for delivery.

26. The method as recited in claim 23, wherein the act of sending a dequeue message in response to the message available message comprises an act of sending a dequeue message that identifies a message queue and the application message.

27. The method as recited in claim 23, wherein the act of sending a dequeue message in response to the message available message comprises an act of using an atomic transaction context to coordinate dequeueing the application message with other application state changes.

28. The method as recited in claim 23, wherein the act of sending a dequeue message in response to the message available message comprises an act of participating in a two-phase commit.

29. The method as recited in claim 23, wherein the act of sending a dequeue message in response to the message available message comprises an act of using a reliable messaging protocol to send the dequeue message.

30. The method as recited in claim 23, wherein the act of receiving a dequcue response compnses an act of receiving a SOAP dequeue response that encapsulates an encoded SOAP application message.

31. The method as recited in claim 23, wherein the act of receiving a dequeue response comprises an act of receiving a dequeue response that includes information for decoding an encoded application message encapsulated within the dequeue response.

32. The method as recited in claim 23, wherein the act of receiving a dequeue response comprises an act of receiving a SOAP dequcue response that reuses at least one composable protocol element from an encoded SOAP application message encapsulated within the dequeue response.

33. The method as recited in claim 23, wherein the act of receiving a dequeue response comprises an act of using an atomic transaction context to coordinate dequeueing the application message with other application state changes.

34. The method as recited in claim 23, wherein the act of receiving a dequeue response comprises an act of participating in a two-phase commit.

35. The method as recited in claim 23, wherein the act of receiving a dequeue response comprises an act of using a reliable messaging protocol to receive the dequeue response.

36. The method as recited in claim 23, wherein the act of decoding the encoded application message into the application message comprises an act of decoding a text encoded application message.

37. The method as recited in claim 23, wherein the act of decoding the encoded application message into the application message comprises an act of decoding a binary encoded application message.

38. The method as recited in claim 37, wherein the act of decoding a binary encoded application message comprises an act of decoding a base64 encoded application message.

39. The method as recited in claim 23, wherein the act of decoding the encoded application message into the application message comprises:
   an act of providing the encoded application message, an encoding type, and a content type as input to an unwrapping algorithm; and
   an act of receiving the application message as output from the unwrapping algorithm.

40. The method as recited in claim 23, further comprising an act of performing at least one of decrypting and verifying the integrity of the dequeue response.

41. The method as recited in claim 23, further comprising an act of performing at least one of decrypting and verifying the integrity of the encoded application message prior to decoding the encoded application message.

42. The method as recited in claim 23, wherein the act of sending the application message to the application comprises an act of sending a SOAP message to the application.

43. The method as recited in claim 23, further comprising:
an act of sending a wake-up notification to the application prior to delivering the application message to the application.

44. The method as recited in claim 23, further comprising:
an act of receiving a session available message prior to receiving the message available message, the session available message indicating that message is part of an application session;
an act of sending a session accept message in response to the session available message; and
an act of receiving a session accept response subsequent to sending the session accept message.

45. The method as recited in claim 23, further comprising:
an act of sending a registration message indicating an interest in messages corresponding to the application, prior to receiving the message available message; and
an act of receiving a registration response indicating that the registration was successful.

46. A computer program product for use at a computer system that is network connectable along with one or more other computer systems to a network, the computer program product for implementing a method of reliably enqueing a message, the computer program product comprising one or more computer storage media storing computer-executable instructions, that when executed by a processor, cause the computer system to perform the following:
receive an application message configured in accordance with a messaging protocol, the application message including one or more composable protocol elements selected from the group consisting of addressing, security, reliability, and transaction protocol elements;
encode the application message into a corresponding encoded application message to obscure the one or more composable protocol elements included in the application message;
reuse the one ore more composable protocol elements included in the application message in an enqueue message to configure the enqueue message in accordance with the messaging protocol, the enqueue message identifying a message queue that is to queue the application message;
encapsulate the encoded application message in the enqueue message such that the one or more composable protocol elements encoded in the application message are obscured and do not interfere with reusing the one or more composable protocol elements in the enqueue message;
send the enqueue message to a queue manager that controls the identified queue such that the application message can be queued for delivery to a receiving computer system; and
receive an enqueue response from the queue manager.

47. A computer program product for use at a computer system that is network connectable along with one or more other computer systems to a network, the computer program product for implementing a method of reliably transferring a message, the computer program product comprising one or more computer storage media storing computer-executables instructions, that when executed by a processor, cause the computer system to perform the following:
receive a message available message indicating that an application message, configured in accordance with a messaging protocol, is available for delivery to an application, wherein the application message includes one or more composable protocol elements selected from the group consisting of addressing, security, reliability, and transaction protocol elements, and wherein the application message is encoded to obscure the one or more composable protocol elements included in the application message;
send a dequeue message in response to the message available message, the dequeue message indicating that the encoded application message is to be dequeued for delivery to the application, wherein the act of sending the dequeue message uses a reliable messaging protocol and comprises an act of participating in a two-phase commit;
receive a dequeue response, the dequeue response configured in accordance with the messaging protocol, the dequeue response encapsulating the encoded application message and reusing the one or more composable protocol elements encoded in the application message such that the one or more encoded composable protocol elements do not interfere with reusing the one or more composable protocol elements in the dequeue response;
decode the encoded application message into the application message; and
send the application message to the application.

* * * * *